United States Patent
Asano

(10) Patent No.: US 8,885,224 B2
(45) Date of Patent: Nov. 11, 2014

(54) INFORMATION EMBEDDING METHOD, ITS PROGRAM AND INFORMATION EMBEDDING DEVICE

(75) Inventor: Motohiro Asano, Osaka (JP)

(73) Assignee: Konica Minolta Business Technologies, Inc. (JP)

( * ) Notice: Subject to any disclaimer, the term of this patent is extended or adjusted under 35 U.S.C. 154(b) by 1452 days.

(21) Appl. No.: 12/529,822

(22) PCT Filed: Feb. 20, 2008

(86) PCT No.: PCT/JP2008/052838
§ 371 (c)(1),
(2), (4) Date: Sep. 3, 2009

(87) PCT Pub. No.: WO2008/111374
PCT Pub. Date: Sep. 18, 2008

(65) Prior Publication Data
US 2010/0060945 A1    Mar. 11, 2010

(30) Foreign Application Priority Data
Mar. 14, 2007   (JP) ................................ 2007-064720

(51) Int. Cl.
H04N 1/40 (2006.01)
H04N 1/32 (2006.01)
G03G 15/04 (2006.01)
G03G 15/32 (2006.01)

(52) U.S. Cl.
CPC ..... *G03G 15/04018* (2013.01); *H04N 1/32299* (2013.01); *H04N 2201/3239* (2013.01); *H04N 2201/327* (2013.01); *G03G 15/326* (2013.01); *H04N 1/32203* (2013.01); *G03G 2215/0492* (2013.01); *H04N 1/32208* (2013.01); *H04N 2201/3236* (2013.01); *H04N 1/32304* (2013.01)

USPC ............................................ 358/3.28; 358/468

(58) Field of Classification Search
USPC .................. 358/3.28, 1.9, 2.1, 468, 400, 500, 358/434–436, 426.12, 438–439
See application file for complete search history.

(56) References Cited

U.S. PATENT DOCUMENTS 6,246,775 B1 *   6/2001   Nakamura et al. ............ 382/100
2001/0030759 A1  10/2001  Hayashi et al. ................ 358/1.9

FOREIGN PATENT DOCUMENTS

| JP | 2000-138820 A | 5/2000 |
| JP | 2001-218005 A | 8/2001 |
| JP | 2003-283790 A | 10/2003 |
| WO | WO 2008/111374 A1 | 9/2008 |

* cited by examiner

*Primary Examiner* — Marivelisse Santiago-Cordero
*Assistant Examiner* — Stephen M Brinich
(74) *Attorney, Agent, or Firm* — Cantor Colburn LLP

(57) ABSTRACT

There are used a first information embedding method that is used for embedding first information and specified by a first information expression rule and a second information embedding method that is used for embedding second information and specified by a second information expression rule different from the first information expression rule. The first information and the second information are so embedded that at least parts of the first and second information overlap with each other in an identical area. This makes it possible to provide an information embedding method, its program, and an information embedding device capable of generating an embedded image that is beautiful in appearance because the boundary between the first and second information is inconspicuous and is also safe because it is difficult to decipher the embedded information.

14 Claims, 19 Drawing Sheets

FIG. 7

| EXAMPLE OF DIVIDING FIRST INFORMATION INF1 | | |
|---|---|---|
| PATTERN NUMBER | EXAMPLE OF EMBED-DATA UNIT EU (5 BITS) | |
| | BINARY | DECIMAL |
| 1ST PATTERN | 01110 | 14 |
| 2ND PATTERN | 10100 | 20 |
| 3RD PATTERN | 11110 | 30 |
| 4TH PATTERN | 00101 | 5 |
| 5TH PATTERN | 10000 | 16 |
| 6TH PATTERN | 00000 | 0 |
| 7TH PATTERN | 01001 | 9 |
| 8TH PATTERN | 10111 | 23 |
| 9TH PATTERN | 00010 | 2 |
| 10TH PATTERN | 10001 | 17 |
| 11TH PATTERN | 11010 | 26 |
| 12TH PATTERN | 11111 | 31 |
| 13TH PATTERN | 11000 | 24 |
| 14TH PATTERN | 00101 | 5 |
| 15TH PATTERN | 10001 | 17 |
| 16TH PATTERN | 00111 | 7 |
| 17TH PATTERN | 00001 | 1 |
| 18TH PATTERN | 01011 | 11 |
| 19TH PATTERN | 11101 | 29 |
| 20TH PATTERN | 01101 | 13 |
| 21ST PATTERN | 10010 | 18 |
| 22ND PATTERN | 01111 | 15 |
| 23RD PATTERN | 11001 | 25 |
| 24TH PATTERN | 01000 | 8 |

FIG. 9

| DOT PATTERN TABLE TB1 | | | |
|---|---|---|---|
| EMBED-DATA UNIT EU | | INFORMATION DOT | NUMBER OF |
| BINARY | DECIMAL | [abcd  efgh] | ON-DOTS |
| 00000 | 0 | 0000  0111 | |
| 00001 | 1 | 0000  1011 | |
| 00010 | 2 | 0001  0011 | |
| 00011 | 3 | 0010  0011 | |
| 00100 | 4 | 0100  0011 | |
| 00101 | 5 | 1000  0011 | |
| 00110 | 6 | 0000  1101 | |
| 00111 | 7 | 0001  0101 | |
| 01000 | 8 | 0010  0101 | |
| 01001 | 9 | 0100  0101 | |
| 01010 | 10 | 1000  0101 | |
| 01011 | 11 | 0001  1001 | |
| 01100 | 12 | 0010  1001 | |
| 01101 | 13 | 0100  1001 | |
| 01110 | 14 | 1000  1001 | |
| 01111 | 15 | 0011  0001 | |
| 10000 | 16 | 0101  0001 | |
| 10001 | 17 | 1001  0001 | 3 |
| 10010 | 18 | 0110  0001 | |
| 10011 | 19 | 1010  0001 | |
| 10100 | 20 | 1100  0001 | |
| 10101 | 21 | 0000  1110 | |
| 10110 | 22 | 0001  0110 | |
| 10111 | 23 | 0010  0110 | |
| 11000 | 24 | 0100  0110 | |
| 11001 | 25 | 1000  0110 | |
| 11010 | 26 | 0001  1010 | |
| 11011 | 27 | 0010  1010 | |
| 11100 | 28 | 0100  1010 | |
| 11101 | 29 | 1000  1010 | |
| 11110 | 30 | 0011  0010 | |
| 11111 | 31 | 0101  0010 | |
| SPECIAL POSITIONING PATTERN SP | | 1001  0010 | |

DATA VALUE 10 = 1000 0101

| 1ST PATTERN (14) | 2ND PATTERN (20) | 3RD PATTERN (30) | 4TH PATTERN (5) | 5TH PATTERN (16) |
|---|---|---|---|---|
| 6TH PATTERN (0) | 7TH PATTERN (9) | 8TH PATTERN (23) | 9TH PATTERN (2) | 10TH PATTERN (17) |
| 11TH PATTERN (26) | 12TH PATTERN (31) | SPECIAL POSITIONING PATTERN SP | 13TH PATTERN (24) | 14TH PATTERN (5) |
| 15TH PATTERN (17) | 16TH PATTERN (7) | 17TH PATTERN (1) | 18TH PATTERN (11) | 19TH PATTERN (29) |
| 20TH PATTERN (13) | 21ST PATTERN (18) | 22ND PATTERN (15) | 23RD PATTERN (25) | 24TH PATTERN (8) |

DESCRIPTION IN PARENTHESIS REPRESENTS DATA VALUE

FIG. 12    ED1

| SECOND DOT PATTERN TABLE TB2 ||
| EMBED-DATA UNIT EU ||
| DUMMY INFORMATION PATTERN NUMBER | PERMISSION OF REPRODUCTION DOT POSITION [ABCD] |
|---|---|
| 1ST PATTERN | 1010 |
| 2ND PATTERN | 0000 |
| 3RD PATTERN | 0000 |
| 4TH PATTERN | 0101 |

DT

DD

BD

INFORMATION EMBEDDING METHOD, ITS PROGRAM AND INFORMATION EMBEDDING DEVICE

RELATED APPLICATIONS

This application is a U.S. National Phase Application under 35 USC 371 of International Application PCT/JP2008/052838, filed Feb. 20, 2008, which claims priority to Japanese Patent Application No. 2007-064720, filed Mar. 14, 2007.

FIELD OF THE INVENTION

The present invention relates to an information embedding method, its program and an information embedding device, particularly to an information embedding method, its program and an information embedding device wherein two types of information are embedded in different methods in such a way that there is at least a partial overlapping between them in one and the same area.

BACKGROUND OF THE INVENTION

With ongoing improvements in the digitization of information, data embedding methods as represented by the electronic watermark method have come into common use, and have come to be applied to the analog image medium such as printed matters and reproductions in recent years.

The data embedding method for printed matters is represented by the technique wherein, for example, dots are arranged at equally spaced intervals as a background of the document image and others at the time of printing, and whereby data is embedded as the dot arrangement and profile.

To detect the embedded data, when the document image is read by a scanner etc., the dot arrangement and profile reproduced together with the document image are detected, and the embedded data is extracted and restored.

One of the techniques related to embedding and detection of data using dots is the method of generating a background wherein a reproduction prohibition pattern image area and the conditional pattern image area for canceling the reproduction prohibition are repeatedly arranged in a two-dimensional array according to a predetermined rule, and are overlapped with the document image, whereby a composite image is generated (for example, Patent Literature 1).

Patent Literature 1: Japanese Unexamined Patent Application Publication No. 2003-283790

DISCLOSURE OF THE INVENTION

Object of the Invention

According to the method disclosed in Patent Literature 1, however, the reproduction prohibition pattern image area and the conditional pattern image area for canceling the reproduction prohibition are arranged in different areas. This results in the repetition of a regular pattern, and the boundary between the two areas is very conspicuous. This is an offensive sight, and is not appropriate to be used in a background for the document image. Further, the area wherein data is embedded can be easily detected, and then the embedded information can be decoded, and a serious security problem will arise.

In view of the prior art problems described above, it is an object of the present invention to provide an information embedding method, its program and an information embedding device capable of generating an embed-image that is visually pleasing because the boundary between the two types of information embedded in the background is not conspicuous, and is also safer because decoding of the embedded information is not easy.

Means for Solving the Object

The object of the present invention can be achieved by the following structures.

1. An information embedding method for embedding information represented by positions in which dots are to be embedded, the information embedding method comprising:

a first information embedding method for embedding first information, the first information embedding method being defined by a first information expression rule; and a second information embedding method for embedding second information, the second information embedding method being defined by a second information expression rule different from the first information expression rule, wherein the first information and the second information are embedded by using the first information embedding method and the second information embedding method such that at least a part of the first information and a part of the second information are overlapped in the same region.

2. The information embedding method of claim 1, wherein the first information and the second information are embedded each having a basic unit of different size of region from each other.

3. The information embedding method of item 1, wherein the first information expression rule and the second information expression rule each expresses different information volume from each other.

4. The information embedding method of item 1, wherein the second information includes information for indicating prohibition or permission of a predetermined operation.

5. The information embedding method of item 4, wherein the first information includes information having an influence on the second information.

6. The information embedding method of item 5, wherein the first information includes information for canceling the prohibition of the predetermined operation.

7. A program for making a computer execute an information embedding method for embedding information represented by positions in which dots are to be embedded, the program including:

a first information embedding method for embedding first information, the first information embedding method being defined by a first information expression rule; and a second information embedding method for embedding second information, the second information embedding method being defined by a second information expression rule different from the first information expression rule, wherein the first information and the second information are embedded by using the first information embedding method and the second information embedding method such that at least a part of the first information and a part of the second information are overlapped in the same region.

8. The program of item 7, wherein the first information and the second information are embedded each having a basic unit of different size of region from each other.

9. The program of item 7, wherein the first information expression rule and the second information expression rule each expresses different information volume from each other.

10. The program of item 7, wherein the second information includes information for indicating prohibition or permission of a predetermined operation.

11. The program of item 10, wherein the first information includes information having an influence on the second information.

12. The program of item 11, wherein the first information includes information for canceling the prohibition of the predetermined operation.

13. An information embedding apparatus configured to embed information by using the information embedding method of item 1.

Advantage of the Invention

According to the present invention, first information and second information are embedded with at least part of each information being overlapped at the same region, where the first information embedding method, which is represented by a first expression rule, is used for embedding the first information and a second information embedding method, which is represented by a second expression rule different from the first expression rule, is used for embedding the second information. This makes it possible to provide an information embedding method, its program and an information embedding device capable of generating an embed-image that is visually pleasing because the boundary between the two types of information is not conspicuous, and is also safer because decoding of the embedded information is not easy.

BRIEF DESCRIPTION OF THE DRAWINGS

FIG. 7 is a table showing an example of the method of dividing the first information into embed-data unit;

FIG. 9 is a table showing an example of the dot pattern table;

NUMERALS

Figure 1:
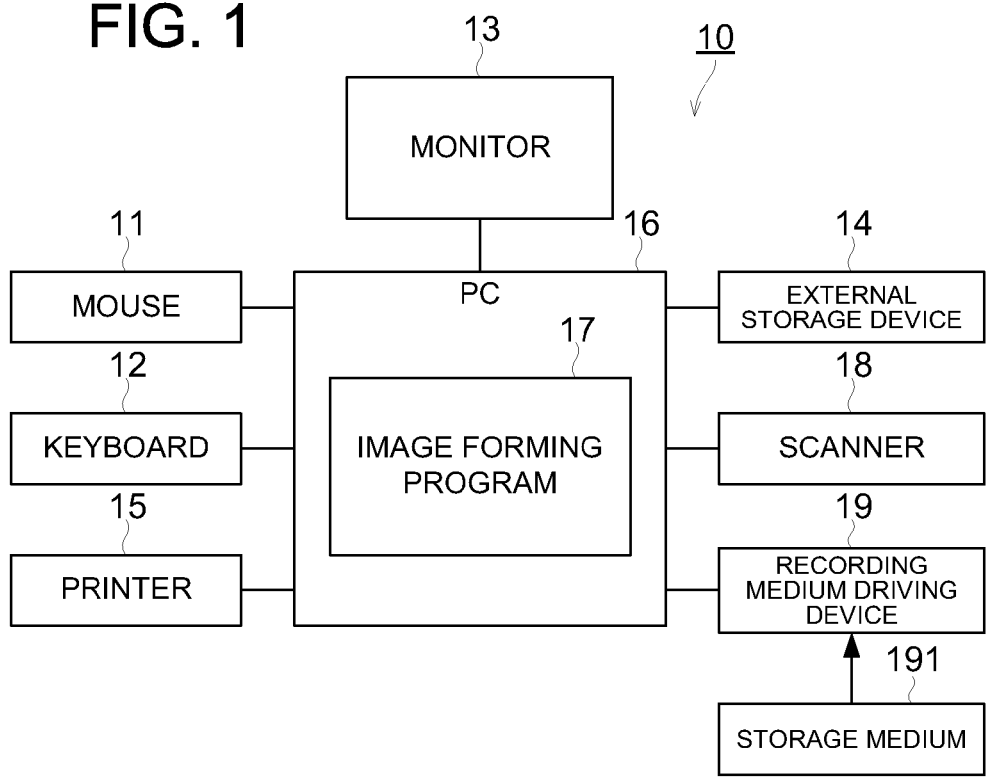
FIG. 1 is a schematic diagram representing an example of the system configuration of an image forming apparatus.

10. Image forming apparatus
11. Mouse
12. Keyboard
13. Monitor
14. External storage apparatus
15. Printer
16. Personal computer (PC)
17. Image forming program
18. Scanner
19. Recording medium driving device
191. Storage medium
21. User instruction
22. Displaying image data
23. Print-image
24. Input/output interface
25. CPU/memory
26. Storage device
27. OS (Operating System)
28. Image forming section
29. Scanned image
31. Operation panel section
32. Scanning section
33. Printer section
34. MFP (Multi Functional Peripheral) main unit
35. Image forming circuit
INF1 First information
ED1 First embed-image
INF2 Second information
ED2 Second embed-image
BD Embed-image
IM Document image
PD Print image
PM Printed matter
EU Embed-data unit
IP Information pattern
DP1 Dot pattern chart
TB1 Dot pattern table
SP Special positioning pattern
LO1 Pattern layout chart
DP2 Second dot pattern chart
TB2 Second dot pattern table
LO2 Second pattern layout chart

BEST MODE FOR CARRYING OUT THE INVENTION

The following describes the present invention with reference to the illustrated embodiment. It is to be expressly understood, however, that the present invention is not restricted thereto. The same or equivalent portions in the drawing will be assigned with the same reference numerals and will not be described to avoid duplication.

(Schematic Configuration of the Image Forming Apparatus)

In the first place, referring to FIG. 1, the following describes an example of the system configuration of the image forming apparatus working as the information embedding apparatus in the present embodiment. FIG. 1 is a schematic diagram representing an example of the system configuration of an image forming apparatus. It shows the case wherein a personal computer (hereinafter referred to as "PC") is used as the image forming apparatus.

In FIG. 1, the image forming apparatus 10 includes a mouse 11, keyboard 12, monitor 13, external storage apparatus 14, printer 15, PC 16, scanner 18 and recording medium driving device 19.

The PC 16 has the same configuration as the hardware of a computer that is in common use. The function of the image forming apparatus 10 is realized by the CPU (Central Processing Unit) (FIG. 2) executing an image forming program 17.

The mouse 11 and keyboard 12 are used as input devices, and are used by the user to input various forms of instructions at the time of starting the image forming program 17 and executing the image forming program 17.

The monitor 13 is used to display the document and image file. Referencing the data displayed on the monitor 13, the user gives instructions to the image forming program 17, whereby the image forming process is carried out.

The external storage apparatus 14 is made up of a hard disk, for example, and is used to store a document and image file. It is also possible to make such arrangements that the image forming program 17 is stored in the external storage apparatus 14, and the PC 16 loads the image forming program 17 into the internal RAM (Random Access Memory) from the external storage apparatus 14, whereby the program is executed.

The printer 15 receives image data with information embedded therein, and an image with information embedded therein is printed out. The print image processed by the image processing program 17 is sent to the printer 15 by the PC 16, whereby an image is formed.

The scanner 18 is a document reading device, and is used to read an image of printed matters, photographs, films and others, and to generate image data to be sent to the PC 16.

The recording medium driving device 19 is a driving device for the storage medium 191 of an information recording disk such as a CD-ROM and DVD-ROM, or memory card. The image data obtained by the image formation made by the PC 16 is stored in the recording medium by the recording medium driving device 19. Further, it is also possible to make such arrangements that the image forming program 17 recorded in the storage medium 191 is loaded into the RAM (Random Access Memory) of the PC 16 through the recording medium driving device 19 so that the program is executed.

Figure 2:
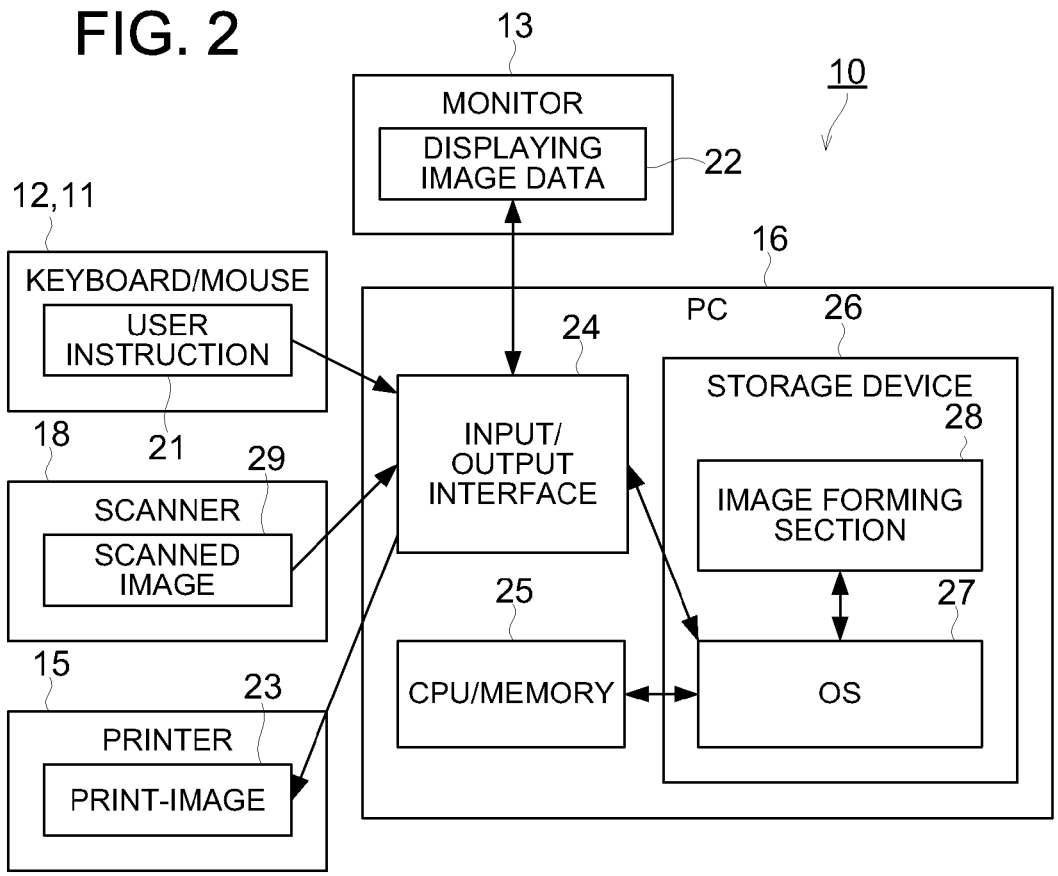
FIG. 2 is a schematic diagram representing the function of the image forming apparatus.

Referring to FIG. 2, the function of the image forming apparatus 10 of FIG. 1 will be described. FIG. 2 is a schematic diagram representing the function of the image forming apparatus 10.

In FIG. 2, the PC 16 includes an input/output interface 24, CPU/memory 25 and storage device 26. The storage device 26 includes the Operating System (OS) 27 and the image forming section 28 that is realized by the image forming program 17. The image forming program 17 runs on the OS 27 to perform the functions of the image forming section 28. In this case, the image forming program 17 works as a program for making the computer execute the information embedding method of the present invention.

The image forming section 28 controls the keyboard 12, mouse 11, monitor 13, printer 15 and scanner 18 by inputting/outputting the data through the OS 27 and input/output interface 24. The image forming section 28 receives user instructions 21 through the keyboard 12 or mouse 11, and performs image formation by displaying image data 22 on the monitor 13, sending the processed image data to the printer 15 as a print-image 23, and receiving the scanned image 29 from the scanner 18. Further, the image forming apparatus 10 can be designed to exchange a document and image file with another PC or the Internet through the network interface (not illustrated).

Figure 3:
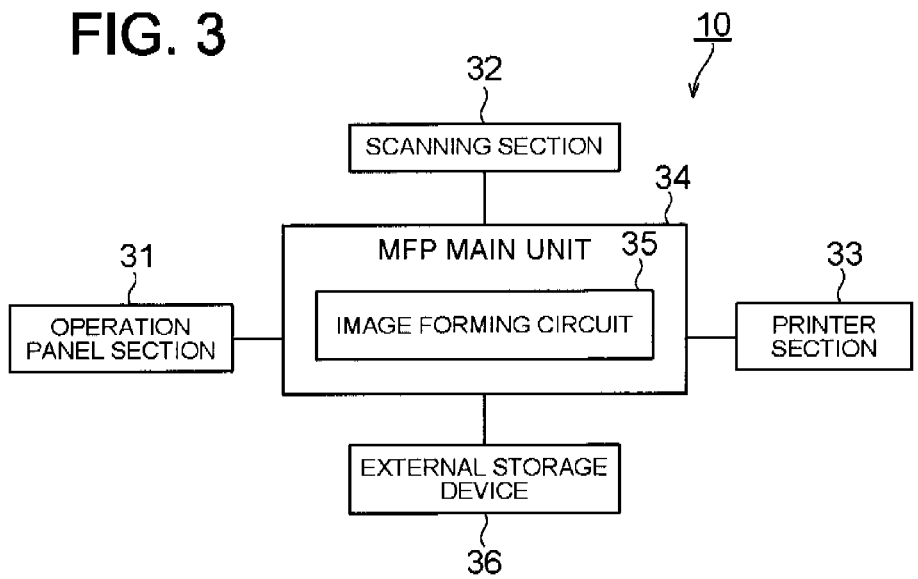
FIG. 3 is a schematic diagram representing another example of the system configuration of an image forming apparatus.

Referring to FIG. 3, the following describes another example of the system configuration of the image forming apparatus 10 of the present invention. FIG. 3 is a schematic diagram representing another example of the system configuration of the image forming apparatus 10 in the present invention. It shows the case where an MFP (Multi Functional Peripheral) constitutes the image forming apparatus 10.

In FIG. 3, the image forming apparatus 10 includes an operation panel section 31, scanning section 32, printer section 33, MFP main unit 34 and an external storage apparatus 36.

The MFP main unit 34 is made of an image forming circuit 35 and others. The image forming circuit 35 receives the user instruction inputted from the operation panel section 31, and performs image forming operations while controlling the scanning section 32 and printer section 33. The formed image is stored, for example, in the RAM inside the MFP main unit 34 or the external storage apparatus 36, and is read out and printed out wherever required. The image forming circuit 35 realizes the same function as the image forming program 17 of FIG. 1.

Figure 4:
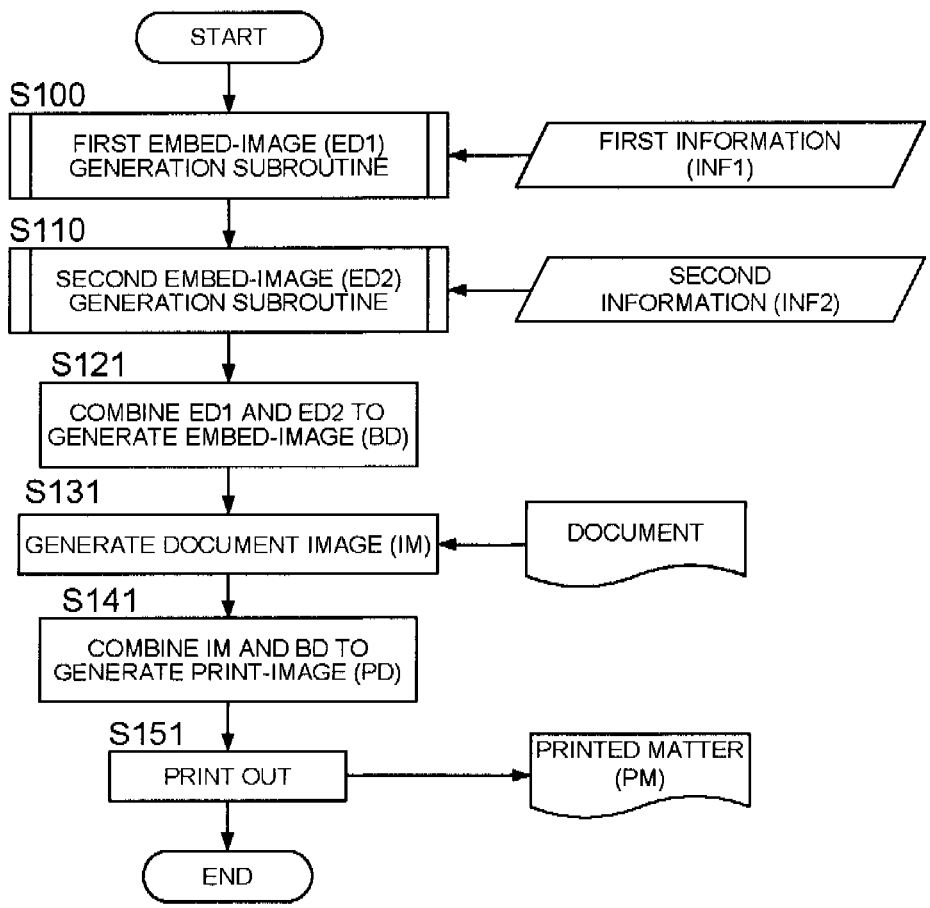
FIG. 4 is a flow chart representing an example of the information embedding method implemented in the image forming apparatus.
Figure 5:
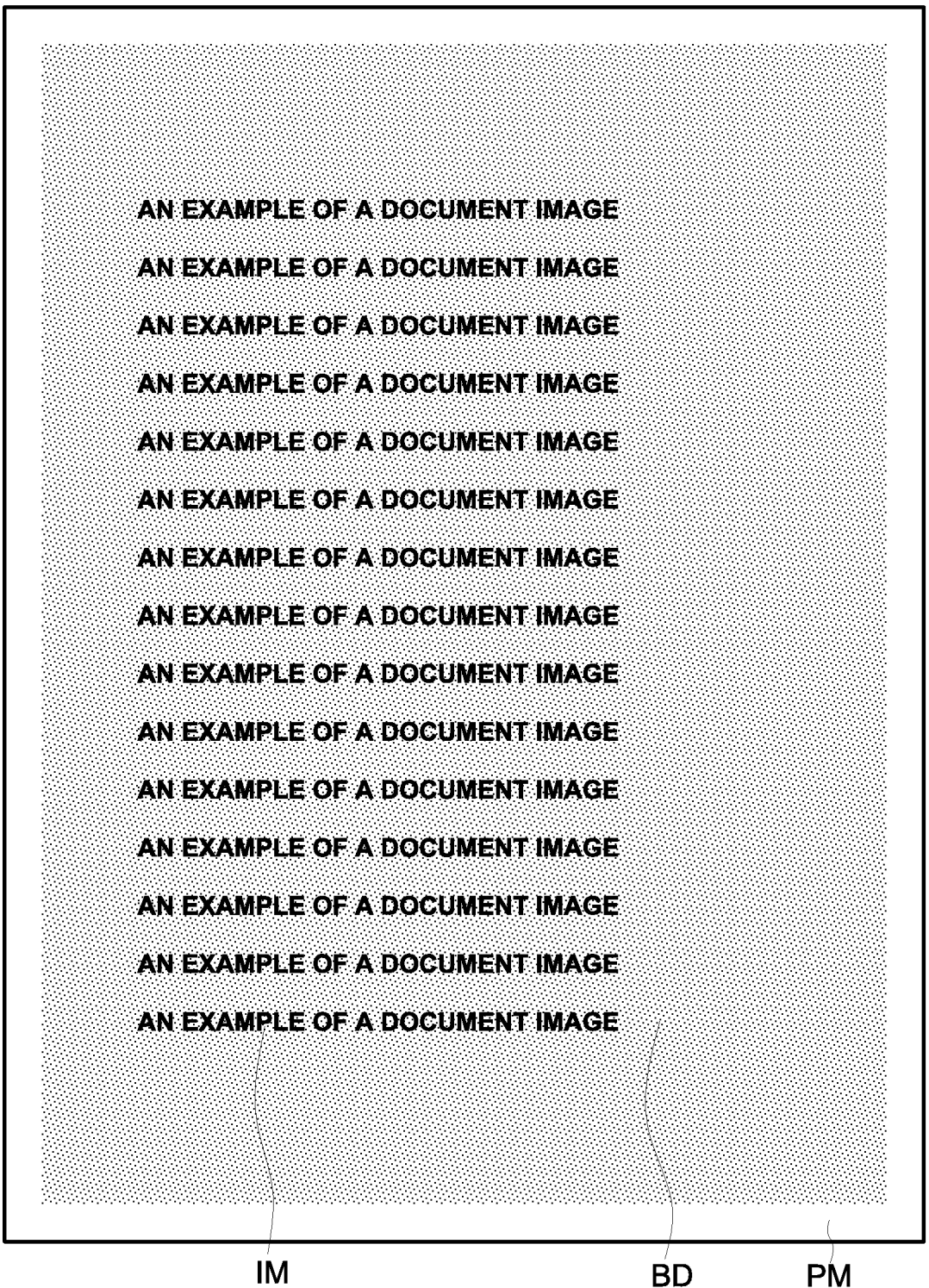
FIG. 5 is a schematic diagram representing examples of copies printed out according to the configuration wherein the background image data with two types of information embedded therein is arranged as a background of the image data.

Referring to FIGS. 4 and 5, the following describes the information embedding method to be implemented by the image forming apparatus 10 of the present invention. FIG. 4 is a flow chart representing an example of the information embedding method implemented by the image forming apparatus 10 of the present invention.

In FIG. 4, the first embed-image ED1 is generated from the inputted first information INF1 according to the first information expression rule in the "first embed-image (ED1) generation subroutine" of Step S100. Then the second embed-image ED2 is generated from the inputted second information INF2 according to the second information expression rule, different from the aforementioned first information expression rule, in the "second embed-image (ED2) generation subroutine" of the Step S110.

The embed-image BD is generated by superimposition of the first embed-image ED1 onto the second embed-image ED2 in Step S121. The method of generating the first embed-image ED1 and the second embed-image ED2, and the method of generating the embed-image BD will be described in FIG. 6 and thereafter.

Here, the reason why the embed-image is generated by dividing information into the first information INF1 and second information INF2 is that that the information of greater importance can be detected even from the embed-image of a small space such as the space between two letters. The information of greater importance is the information that indicates prohibition or permission of the specific operations such as prohibition of reproduction. The information of smaller importance is the information that affects the prohibition or permission of the specific operations, in particular the information w cancels the prohibition of specific operations such as a password or the like for canceling prohibition of reproduction, and the information includes such additional information as the name of the person having created the document and the date of creation. In the present embodiment the second information INF2 is the information of greater importance.

In Step S131, the document and image file stored in the external storage apparatus 14 are read out, the printed matter and photos are read in by the scanner 18, and the document and image are transmitted via the network, whereby the document image IM is generated. In Step S141, the print image PD is generated by combining the embed-image BD generated in Step S121 and the document image IM generated in Step S131. In Step S151, the print image PD is sent to the printer 15, for example, and the printed matter PM is printed out. The series of operations are thus completed.

In the aforementioned example, superimposition of the embed-image BD on the document image IM is performed in Step S141 after the embed-image BD has been generated in Step S121. It is also possible to arrange such a configuration that, without the embed-image BD being generated in Step S121, the superimposition of the first embed-image ED1, second embed-image ED2 on the document image IM may be performed in one operation in Step S141, whereby a print image PD is generated. Further, any method can be used if an embed-image on the same level as the embed-image BD can be obtained.

FIG. 5 is a schematic diagram representing the examples of the printed matter PM according to the configuration wherein the embed-image BD with two types of information embedded therein is arranged as a background of the document image IM.

In FIG. 5, the embed-image BD generated according to the method described with reference to FIG. 4 is repeatedly laid out all over the sheet as a background of the document image IM representing "an example of a document image", and is printed out as a gray pack of almost uniform density.

(Embodiment 1)

Referring to FIGS. 6 through 20, the following describes the first embodiment of the present invention.

(Method of Obtaining the First Embed-image ED1 from the First Information INF1)

Figure 6:
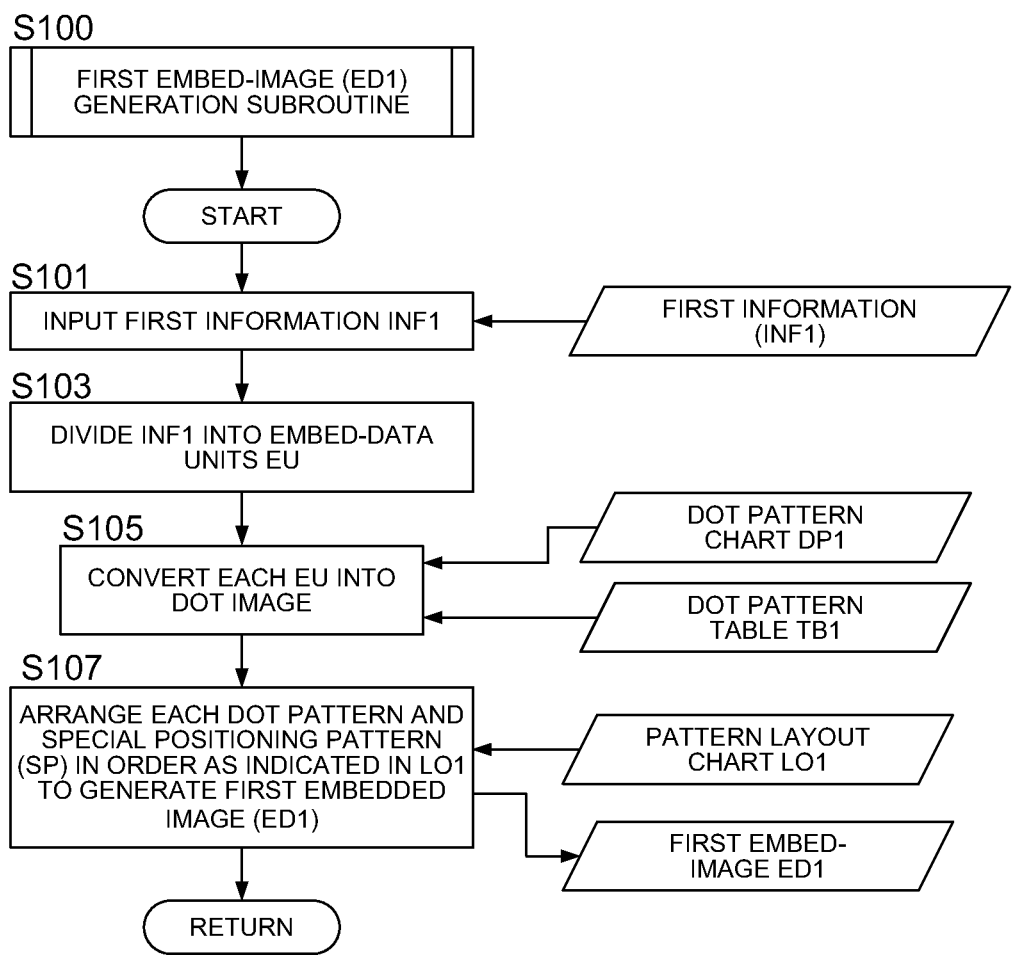
FIG. 6 is a flow chart representing the details of the "first embed-image generation subroutine" of FIG. 4.

In the first place, referring to FIGS. 6 through 12, the following describes the method of obtaining the first embed-image ED1 from the first information INF1 according to the first information expression rule described with reference to the "first embed-image (ED1) generation subroutine" of Step S100 of FIG. 4. FIG. 6 is a flow chart representing the details of the "first embed-image (ED1) generation subroutine" of FIG. 4

In FIG. 6, for example, when the first information INF1 is inputted by the user through the mouse 11, or keyboard 12 of FIG. 1, or the operation panel section 31 of FIG. 3 in Step S101, the inputted first information INF1 is once stored in the RAM inside the PC 16 of FIG. 1 or the MFP main unit 34 of FIG. 3. Alternatively, the first information INF1 can be inputted from the outside via the network, for example. In Step S103, the first information INF1 having been inputted and stored in Step S101 is divided into a plurality of embed-data units EU. Division of the first information INF1 into embed-data units EU will be discussed later with reference to FIG. 7.

In Step S105, according to the dot pattern chart DP1 and dot pattern table TB1, a dot pattern is generated from a plurality of embed-data units EU divided in Step S103. The method for dot patterning of each embed-data unit EU will be discussed later with reference to FIGS. 8 through 10.

In Step S107, the dot pattern corresponding to the embed-data unit EU generated in Step S105 according to the pattern layout chart LO1, and the special positioning pattern SP are arranged, whereby the first embed-image ED1 is generated, and the operation goes back to the Step S100 of FIG. 4. Generation of the first embed-image ED1 will be discussed later with reference to FIGS. 11 and 12. The method shown in Steps S103, S105 and S107 of FIG. 6 is the first information embedding method defined by the first information expression rule of the present embodiment.

Division of the first information INF1 into embed-data units EU will be described with reference to FIG. 7. FIG. 7 is a table showing an example of the method of dividing the first information INF1 into embed-data units EU. As illustrated with reference to FIG. 4, the first information INF1 is the information, such as a password that cancels prohibition of reproduction, which affects the prohibition or permission of specific operations, and the information include such additional information as the name of the person having created the document and the date of creation. The first information INF1 is of less importance than the second information INF2.

In FIG. 7, the first information INF1 is made up of 120-bit data, for example. Assume that this is divided into 24 patterns of 5-bit embed-data units EU. For example, the first five bits are "01110", which is equivalent to decimal "14". This is the first pattern of embed-data unit. For example, the first five bits of the second pattern are "10100", which is equivalent to decimal "20". In this way, 120-bit data is divided into the 5-bit 24 patterns of embed-data units EU.

Figure 8:
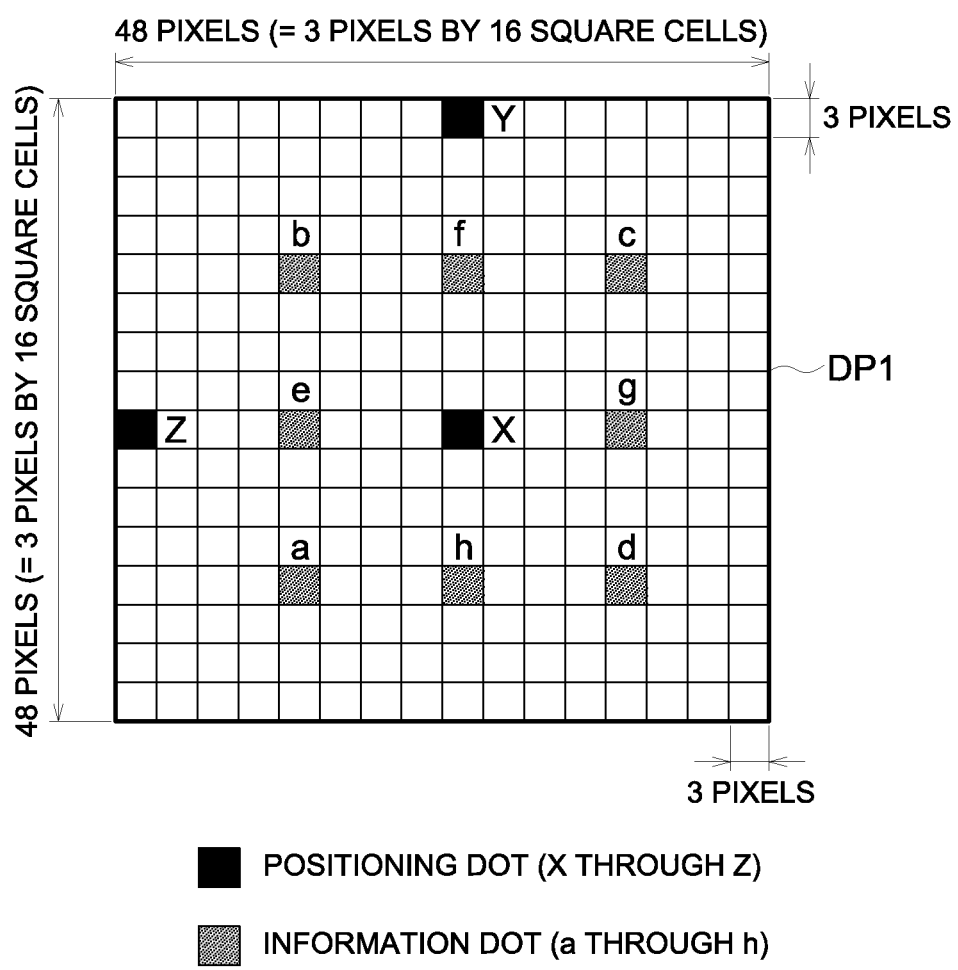
FIG. 8 is a schematic diagram showing a first example of the dot pattern chart.
Figures 10, 11:
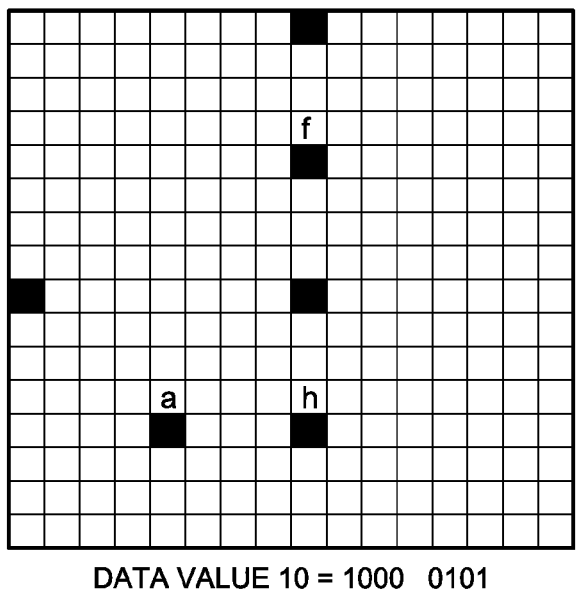
FIG. 10 is a diagram showing an example wherein a dot pattern chart is used to represent the information pattern corresponding to the data "10"
FIG. 11 is a schematic diagram showing an example of the layout of the information pattern generated from the first information.

Referring to FIGS. 8 through 10, the following describes the dot patterning of each piece of the embed-data unit EU. FIG. 8 is a schematic diagram showing a first example of the dot pattern chart DP1 shown in FIG. 6. Here the dot pattern associated with the five-bit embed-data unit EU shown in FIG. 7 is represented in a lattice structure.

In FIG. 8, one square cell of the dot pattern chart DP1 indicates the position corresponding to one dot. One dot has a size of 3-by-3 pixels at the time of printing. To be more specific, one dot is formed of printed 3-by-3 pixels. The dot pattern corresponding to one embed-data unit EU is composed of 16 square cells, in both the horizontal and vertical directions; namely, it is composed of 48 pixels. The black square cell indicates the position where a dot is provided (hereinafter referred to as "dot-on position"). The white square cell indicates the position where a dot is not provided (hereinafter referred to as "dot-off position"). The gray square cell indicates the position where a dot is provided (occasionally dot-on position, and occasionally dot-off position).

The three on-dots X, Y and Z shown in FIG. 8 are positioning dots. These dots are provided in every dot pattern, and provide a reference for dot pattern positioning. The gray dot is either provided or not provided depending on the value of the embed-data unit EU. Namely, the gray dot is an information dot. The value of the data is represented by on or off of this dot. In the example of FIG. 8, there are eight information dots from "a" to "h", and 8-bit information can be expressed at the maximum.

FIG. 9 is a table showing an example of the dot pattern table TB1 shown in FIG. 6. Here the 5-bit embed-data units EU (32 combinations) shown in FIG. 7 and the special positioning pattern SP are expressed by using the information of three positions out of the eight information dots shown in FIG. 8, namely, three bits out of eight bits. In the following description, the embed-data unit EU which is represented as the three positioning dots and the three information dots will be called the information pattern IP.

In FIG. 9, the information dot is represented by "0" or "1" of eight bits. Here "0" and "1" are arranged so as to conform to the sequence of the positions "abcdefgh" of the information dots. "1" denotes an on-dot, and "0" denotes an off-dot. For example, the information dot corresponding to decimal data "10" of the embed-data unit EU is "10000101". Thus, "a", "f" and "h" at three positions out of eight information dots are on-dots, and the other dots are all off-dots. The three positioning dots X, Y and Z are always on-dots.

FIG. 10 shows an example wherein the information pattern IP corresponding to the decimal data "10" is represented according to the dot pattern chart DP1 in FIG. 8. As will be apparent from FIG. 10, the three positioning dots and the three on-dots "a", "f" and "h" out of eight information dots are on-dots. All the other dots are off-dots. Similarly, the twenty-four embed-data unit EU shown in FIG. 7 and the special positioning pattern SP are converted into information pattern IPs.

In the example of FIG. 9, the number of on-dots as information dots is always three. This is intended to ensure that one information pattern IP is always represented as six on-dots—three information on-dots plus the aforementioned three positioning dots, whereby the density of all information patterns IP is made uniform, so that the document image IM has a background of uniform density.

Figure 12:
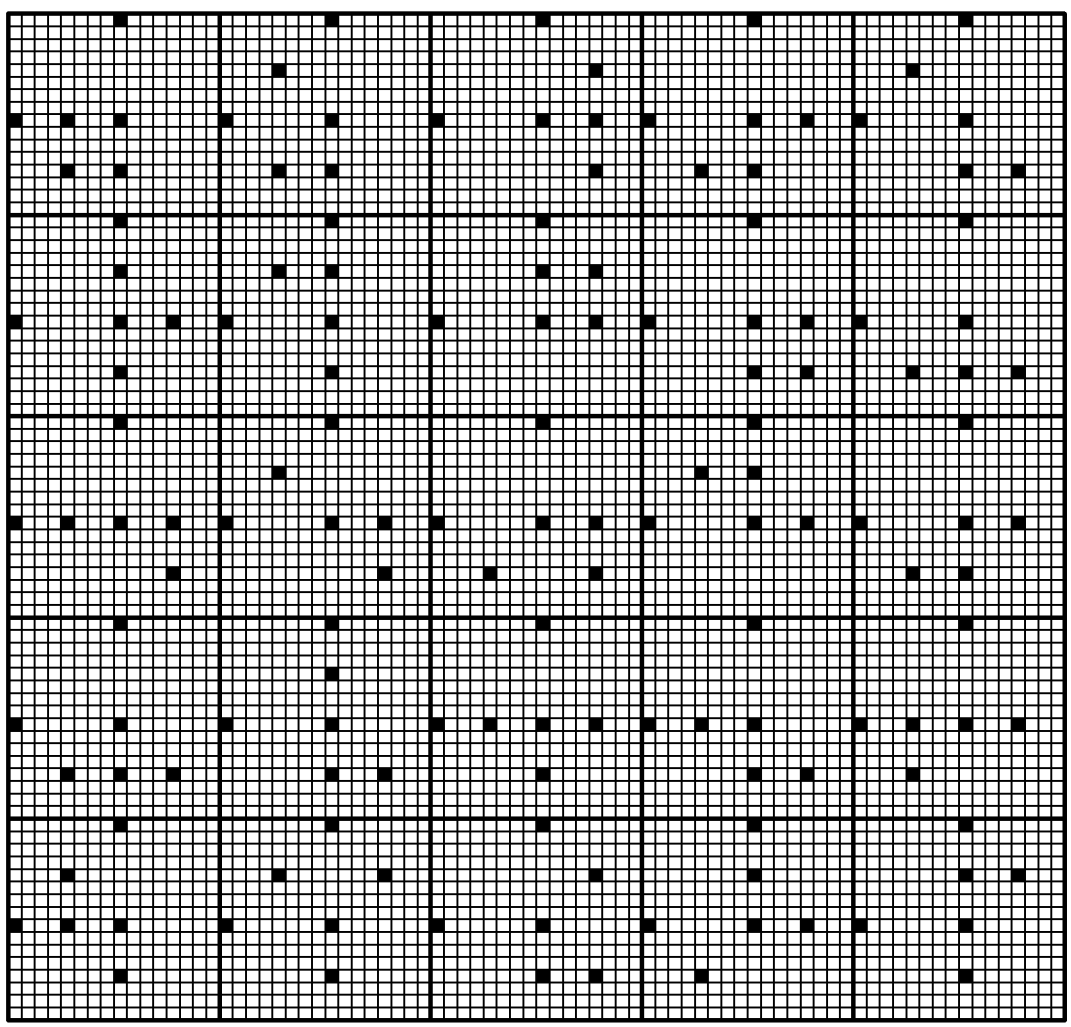
FIG. 12 is a diagram showing an example of the first embed-image corresponding to the first information.

Referring to FIGS. 11 and 12, the following describes the method for generating the first embed-image ED1. FIG. 11 is a schematic diagram showing an example of the pattern layout chart LO1.

In FIG. 11, twenty-four information patterns IP and special positioning patterns SP are arranged at 25 positions (5-by-5 pattern positions). The first five bits shown in FIG. 7, i.e., the information pattern IP as the first pattern corresponding to decimal "14" is arranged at the upper left position 101. The next five bits, i.e., the information pattern IP of the second pattern corresponding to decimal "20" is arranged at the position 102 adjacent to the first pattern on its right side. The other information patterns IS will be arranged similarly hereinafter. The special positioning pattern SP is placed at the center of the 5-by-5 pattern arrangement. The 5-by-5 pattern image generated in the aforementioned manner is the first embed-image ED1. The first embed-image ED1 is arranged with this 5-by-5 pattern area used as a basic unit.

FIG. 12 is a diagram showing an example of the first embed-image ED1 corresponding to the first information INF1 of FIG. 7. Although a lattice structure is illustrated in the drawing to help understanding of the mutual positions of the 25 dots and dot positions in each pattern, only the on-dot is shown as a background of the document image IM.

As shown in FIG. 8, one information pattern IP corresponds to the 48-by-48 pixel area in this example. Thus, the area of the first embed-image ED1 consists of 240-by-240 pixels. Actually, the first information INF1 is embedded over the entire background of the document image IM wherein the 5-by-5 pattern first embed-image ED1 illustrated in FIG. 12 is used as a basic unit.

For example, when one pixel is printed at a resolution of 600 dpi, one dot is about 130 μm square, and one information pattern IP is about 2 mm square. The first embed-image ED1 shown in FIG. 12 is about 10 mm square. Thus, the first embed-images ED1 of FIG. 12 are repeatedly arranged in units of about 10 mm square over the entire area of the background of the document image IM.

(Method of Obtaining the Second Embed-image ED2 from the Second Information INF2)

Figure 13:
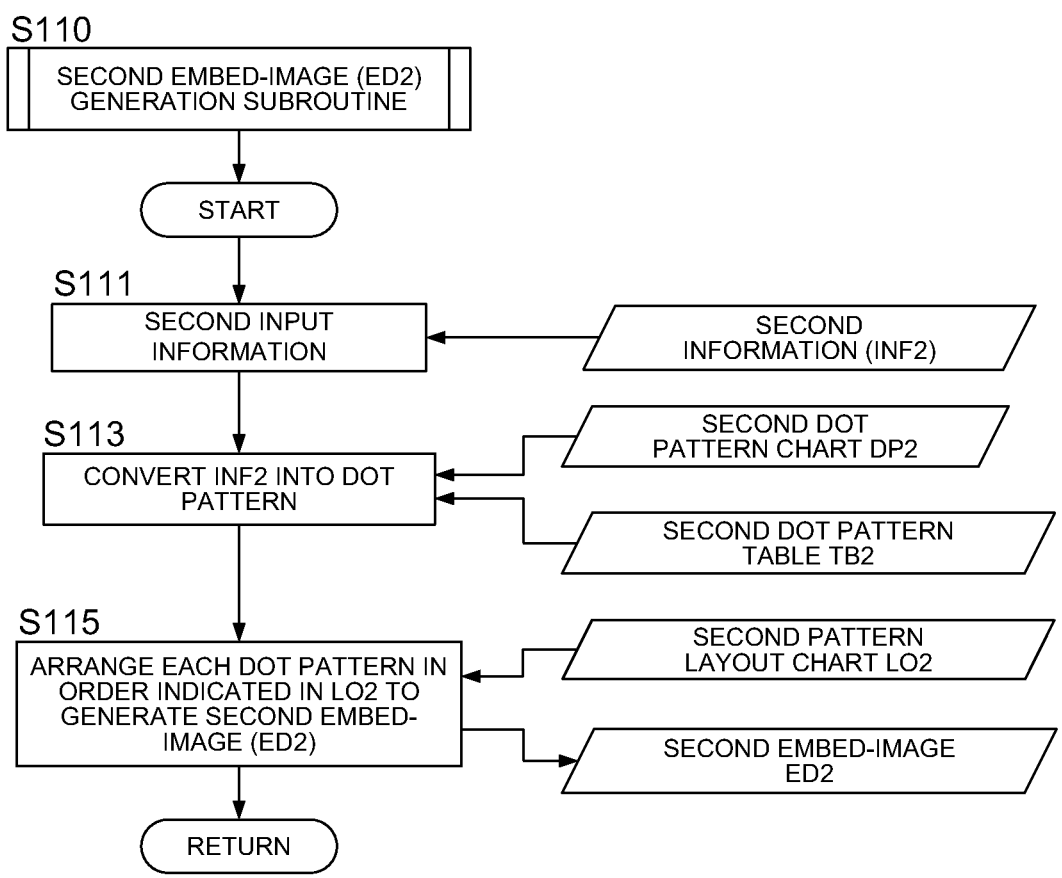
FIG. 13 is a flow chart representing the details of the "second embed-image generation subroutine" of FIG. 4.

Referring to FIGS. 13 through 15, the following describes the method of "generating the second embed-image ED2 from the second information INF2 according to the second information expression rule different from the aforementioned first information expression rule" which is the "second embed-image (ED2) generation subroutine" discussed with reference to Step S110 of FIG. 4. FIG. 13 is a flow chart representing the details of the "second embed-image (ED2) generation subroutine" in Step S110 of FIG. 4.

The second information INF2 is the information of greater importance than the first information INF1, and contains a smaller amount of information, as exemplified by the information, for prohibition or permission, used in a specific operation which prohibits or permits reproduction, the information that forcibly adds a water-mark letter (hereinafter referred to as "water mark") such as "Reproduction" in the background of the copy, and control code for prohibiting/permitting the operation of scanning the document and sending an e-mail.

In FIG. 13, for example, when the second information INF2 is inputted by the user through the mouse 11, or keyboard 12 of FIG. 1, or the operation panel section 31 of FIG. 3 in Step S111, the inputted second information INF2 is once stored in the RAM inside the PC 16 of FIG. 1 or the MFP main unit 34 of FIG. 3. Alternatively, the second information INF2 can be inputted from the outside via the network, for example. In Step S113, the information pattern IP is generated from the second information INF2 having been inputted and stored in Step S111 according to the second dot pattern chart DP2 and second dot pattern table TB2. Information patterning of the second information INF2 will be discussed later with reference to FIG. 14.

In Step S115, the information pattern IP generated in Step S113 is arranged according to the second pattern layout chart LO2, and the second embed-image ED2 is generated. Then the operation goes back to Step S110. The generation of the second embed-image ED2 will be described with reference to FIG. 15. The method described in Steps S113 and S115 of FIG. 13 is the second information embedding method defined by the second information expression rule in the present embodiment.

Figures 14A, 14B:
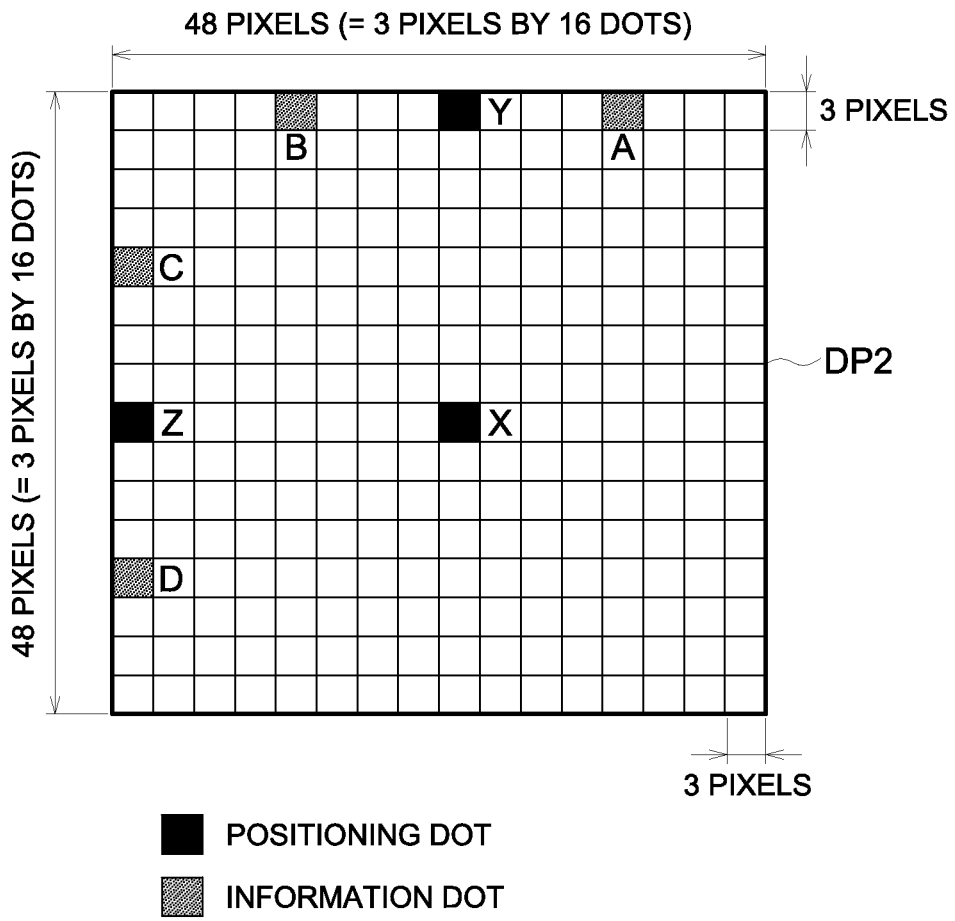
FIGS. 14a and 14b are diagrams representing how the second information is patterned.

FIG. 14 is a diagram representing how the second information is patterned. FIG. 14a shows a first example of the second dot pattern chart DP2, and FIG. 14 b shows a first example of the second dot pattern table TB2. Similarly to the case of FIG. 8, FIG. 14a shows the dot pattern as a lattice structure.

In FIG. 14a, similarly to the case of FIG. 8, one square cell indicates the position corresponding to one dot. One dot has a 3-by-3 pixel size when printed. To put it another way, one dot is formed by 3-by-3 pixel printing. The dot pattern corresponding to one piece of embed-data unit EU is formed of 16 square cells in both the horizontal and vertical directions; namely, it is composed of 48 pixels. The black square cell indicates the position where a dot is provided (hereinafter referred to as "dot-on position"). The white square cell indicates the position where a dot is provided (hereinafter referred to as "dot-off position"). The gray square cell indicates the position wherein a dot is provided or not provided (occasionally dot-on position, and occasionally dot-off position).

The three on-dots X, Y and Z shown in FIG. 14a are positioning dots located at the same position as in the example of FIG. 8. These dots are provided in every dot pattern, and provide a reference for dot pattern positioning. The gray dot is either provided or not provided depending on the second information INF2. Namely, the gray dot is an information dot. The second information INF2 is represented by turning this dot on or off. In FIG. 14a, information dots are located at four positions—A through D—different from the positions in FIG. 8, and the 4-bit information can be expressed at the maximum.

In FIG. 14b, two types of information, assuming reproduction prohibition information and water mark addition information, are expressed as the second information INF2 using four information patterns IP.

In the example of FIG. 14b, the reproduction prohibition information is represented by four information patterns—(1000), (0100), (0010) and (0001). The water mark addition information is represented by four information patterns—(1000), (0010), (0100) and (0001). To put it another way, the information dot in one of the four positions in FIG. 14a is used in this case. Similarly to the case of FIG. 9, this is intended to ensure that the density of all information patterns IP is made uniform so that the document image IM has a background of uniform density.

Figure 15A:
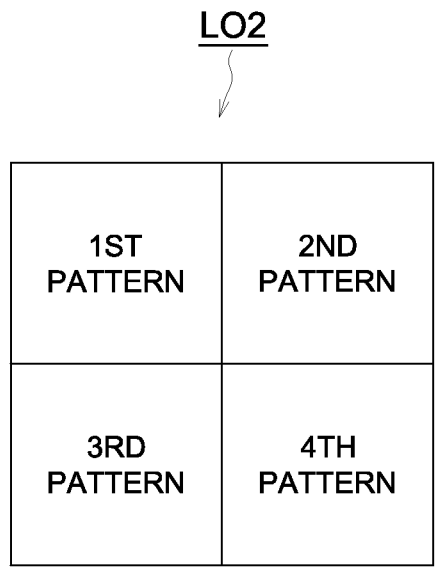
FIGS. 15a, 15b, and 15c are diagrams showing the method of generating the second embedded information.
Figure 15B:
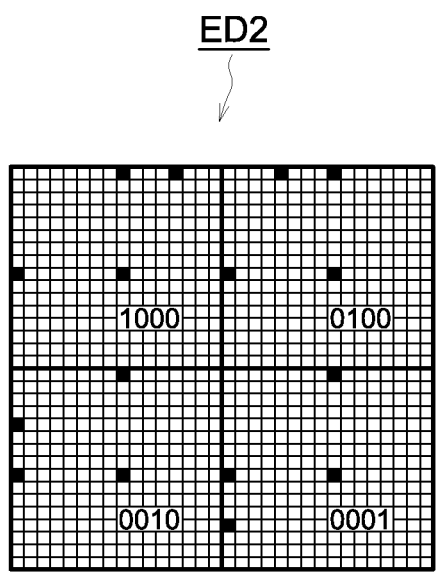
Figure 15C:
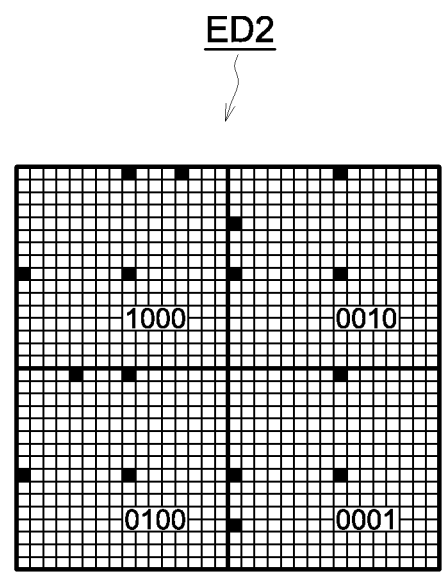

FIGS. 15a, 15b, and 15c are diagrams showing the method of generating the second embedded information ED2. FIG. 15a shows an example of the second pattern layout chart LO2, and FIGS. 15b and 15c show an example of the second embed-image ED2.

In FIG. 15a, the first pattern (1000) of the information patterns IP shown in FIG. 14b is arranged on the upper left of the diagram, the second pattern (0100) is on the upper right, the third pattern (0010) is on the lower left and the fourth pattern (0001) is on the lower right. Different from the first pattern layout chart LO1 of FIG. 11, the special positioning pattern SP is not used. Thus, the area of the second embed-image ED2 is composed of a 2-by-2 pattern. The second embed-image ED2 is arranged with this 2-by-2 pattern area used as a basic unit. The layout example of the specific information pattern of reproduction prohibition information shown in FIG. 14b is shown, together with the square cell, in FIG. 15b, and the layout example of the specific information pattern of the water mark additional information is shown in FIG. 15c.

Similarly to the description with reference to FIG. 12, for example, when one pixel is printed at a resolution of 600 dpi, one dot is about 130 μm square, and one information pattern IP is about 2 mm square. The second embed-image ED2 shown in FIG. 15b or 15c is about 4 mm square. Thus, the 4 mm square second embed-images ED2 of FIG. 15b or 15c are repeatedly arranged in the background of the document image IM.

Thus, the second information INF2 of greater importance than the first information INF1 is repeatedly embedded, wherein the 2-by-2 pattern area is used as a basic unit. The first information INF1 is repeatedly embedded, wherein the 5-by-5 pattern area is used as a basic unit. Thus, the first information INF1 and second information INF2 are embedded, wherein the areas of different sizes are used as basic units. To be more specific, the second information INF2 is represented in a smaller area about one sixth of the first information INF1, therefore, information can be read easily even in a small area like a space between letters when information is read from the background.

(Method of Generating an Embed-image BD from the First Embed-image ED1 and Second Embed-image ED2)

Figure 16:
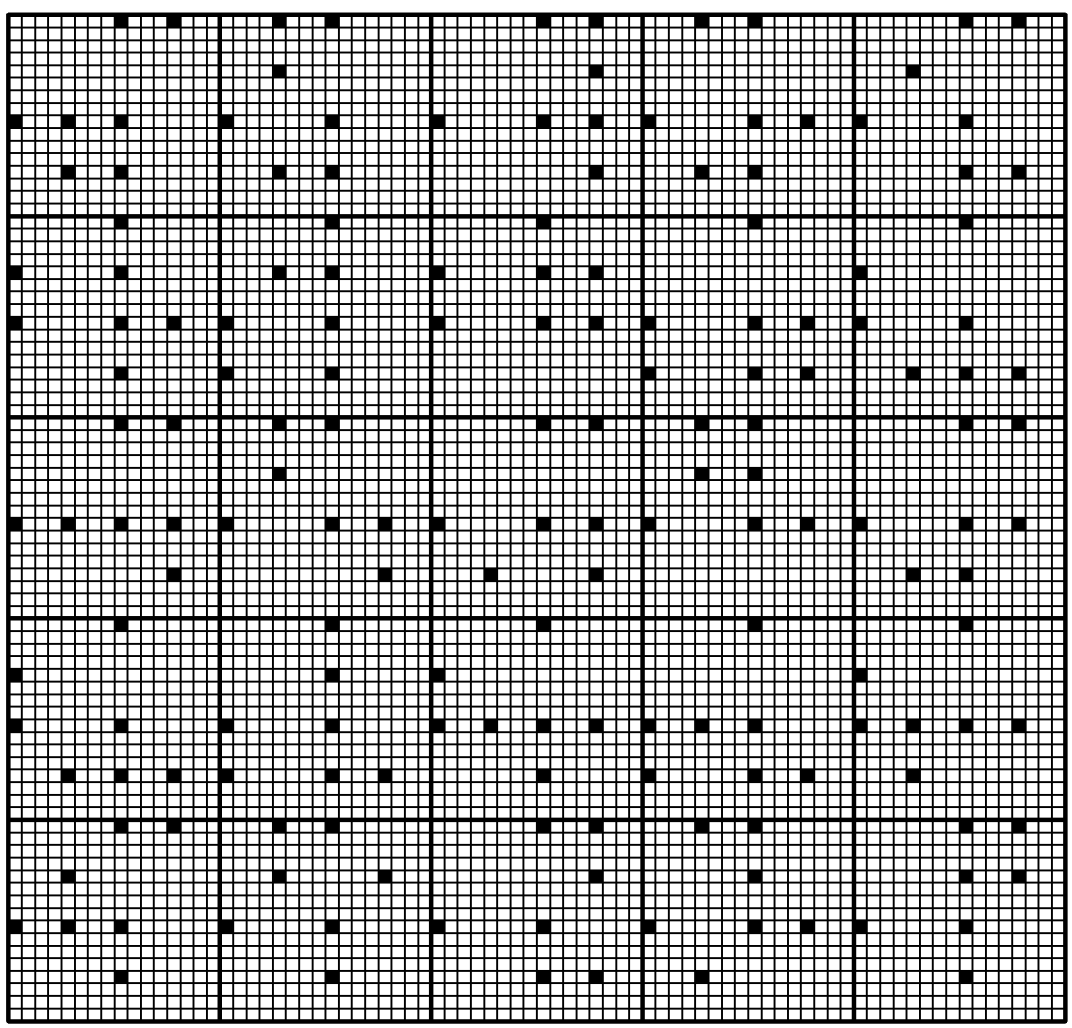
FIG. 16 is a diagram showing an example of the embed-image generated by superimposition of the first embed-image and second embed-image.
Figure 17:
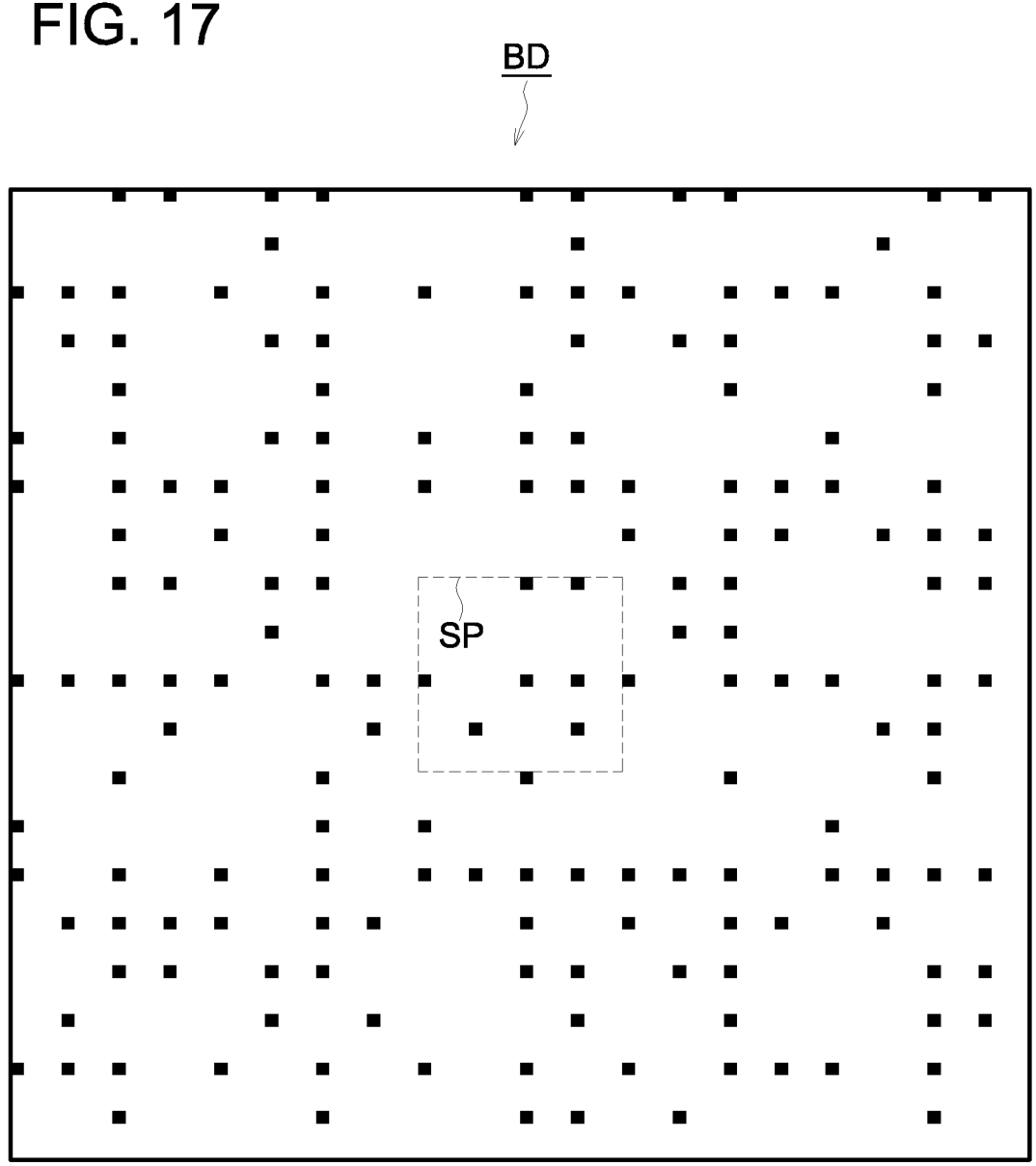
FIG. 17 is a diagram showing only the on-dots of FIG. 16.

Referring to FIGS. 16 and 17, the following describes the method of "generating an embed-image BD by combining the first embed-image ED1 and the second embed-image ED2" described with reference to S121 of FIG. 4. FIGS. 16 and 17 show an example of the embed-image generated by combining the first embed-image ED1 and the second embed-image ED2. Here, the reproduction prohibition information of FIG. 15b will be used as the second embed-image ED2.

In the method of generating the embed-image BD, the first embed-image ED1 of FIG. 12 is first arranged by every 5-by-5 pattern area, which is the area of ED1, over the entire print screen. Then, three positioning dot positions of the first pattern of the first embed-image ED1 are matched with three positioning dot positions of the first pattern of the second embed-image ED2 for expressing the reproduction prohibition information of FIG. 15b. Then, the second embed-image ED2 is repeatedly arranged every 2-by-2 pattern area as an image area thereof over the entire print screen.

The area of the first embed-image ED1 is a 5-by-5 pattern, and that of the second embed-image ED2 is a 2-by-2 pattern. Superimposition of the first embed-image ED1 and second embed-image ED2 is carried out, wherein 10-by-10 patterns as a least common multiple thereof are used as a repeating unit. Thus, the embed-image BD is obtained by a repeated arrangement thereof.

FIG. 16 is a diagram showing a cut out area corresponding to the first embed-image ED1 of a 5-by-5 pattern constituting the embed-image BD which is composed of the first embed-image ED1 and the second embed-image ED2 superimposed on each other.

FIG. 17 only shows the on-dot data actually placed in the background of the document image IM, without showing the lattice structure of FIG. 16. Actually, the dot pattern shown in FIG. 17 is repeatedly arranged over the entire background of the document image IM.

As can been seen from FIG. 17, random dots seem to be irregularly placed, without the boundary of information patterns being conspicuous. It should be noted that a rectangle shown by the broken line in FIG. 17 indicates the position of the special positioning pattern SP arranged at the center 125 of 25 patterns shown in FIG. 11. The superimposition of three positioning dots X, Y and Z, the special positioning pattern (10010010) shown in FIG. 9, and the first pattern (1000) of the reproduction prohibition information shown in FIG. 15(b) can be found in this position.

As illustrated above, according to the first embodiment, two types of information each of which has a basic unit composed of a different number of patterns from each other are superimposed to make an embed-image in such a way that the positioning dots of each type of information occupy the same positions. Thus, even if the two types of information are embedded, it is possible to provide an information embedding method, its program and an information embedding device capable of generating an embed-image that is visually pleasing because the boundary between the two types of information embedded in the background is not conspicuous, and is also safer because decoding of the embedded information is not easy.

(Variation 1 of the First Embodiment)

In a document consisting of several pages, for example, one may wish to embed reproduction prohibition information as shown in FIG. 17, only in a specific page, and in other pages he or she wish to embed only the first information INF1 in the background without embedding the reproduction prohibition information. In this case, to ensure that there is no apparent distinction between the pages with or without the reproduction, dummy information such as the information representing reproduction permission, for example, should be added in the pages where reproduction prohibition information is not embedded. This reproduction permission is dummy information, and it does not affect the reproduction operation at all when the information is read out.

Figures 18A, 18B:
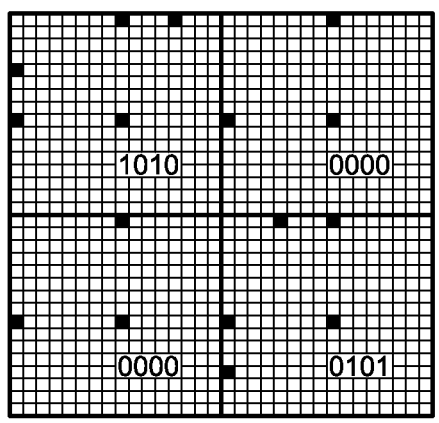
FIGS. 18a and 18b are diagrams showing the dummy information used instead of the second information.

The dummy information will be described with reference to FIGS. 18a, 18b and 19. FIGS. 18a and 18b are diagrams showing the dummy information used instead of the second information INF2. FIG. 18a shows the dummy information dot pattern table, and FIG. 18b indicates a specific example of the information pattern IP of the dummy information.

In FIG. 18a, the reproduction permission information to be used as the dummy information is represented by using four patterns, similarly to the case of the second embed-image ED2 representing the reproduction prohibition information. For example, four information patterns of (1010), (0000), (0000) and (0101) are used. These are arranged according to the second pattern layout chart LO2 of FIG. 15a, as illustrated in FIG. 18b.

Figure 19:
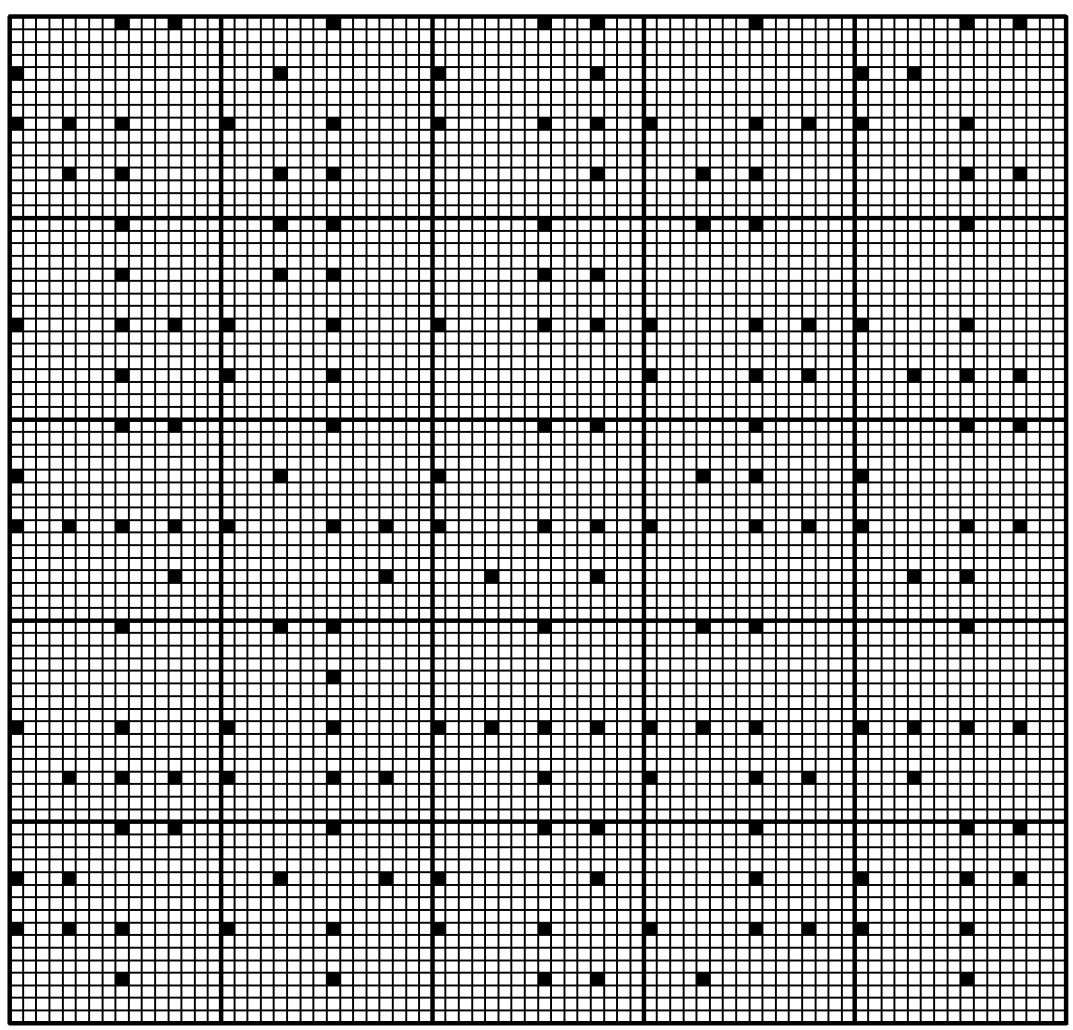
FIG. 19 is a diagram showing the embed-image generated by superimposing the pattern of the dummy information onto the first embed-image.

Further, the information pattern of the dummy information of FIG. 18b is superimposed on the first embed-image ED1 of FIG. 12, whereby the embed-image BD is generated, as shown in FIG. 19. As can easily be seen, the background is formed so that this image cannot be distinguished from the embed-image BD generated by combining the first embed-image ED1 of FIG. 16 and the second embed-image ED2 used as the reproduction prohibition information.

As described above, in the first embodiment, when the second information INF2 such as reproduction prohibition information is not embedded, by embedding the dummy information generated in the same manner as the second information INF2, instead of the second information INF2, it is possible to generate the embed-image BD which cannot be easily distinguished from the embed-image BD generated by embedding the second information INF2. This makes it possible to provide an information embedding method, its program and an information embedding device capable of generating an embed-image that is visually pleasing because the boundary between the two types of information embedded in the background is not conspicuous, and is also safer because decoding of the embedded information is not easy.

(Variation 2 of the First Embodiment)

Figure 20A:
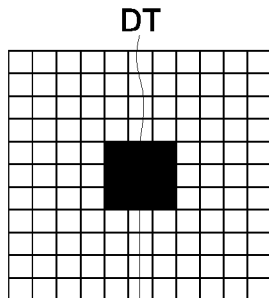
FIGS. 20a, 20b, and 20c are diagrams showing the method for eliminating the microscopic irregularities in the background.
Figure 20B:
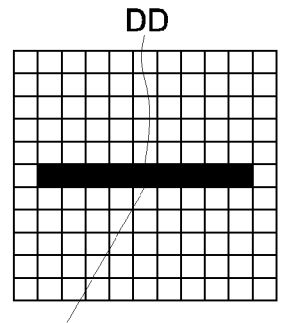
Figure 20C:
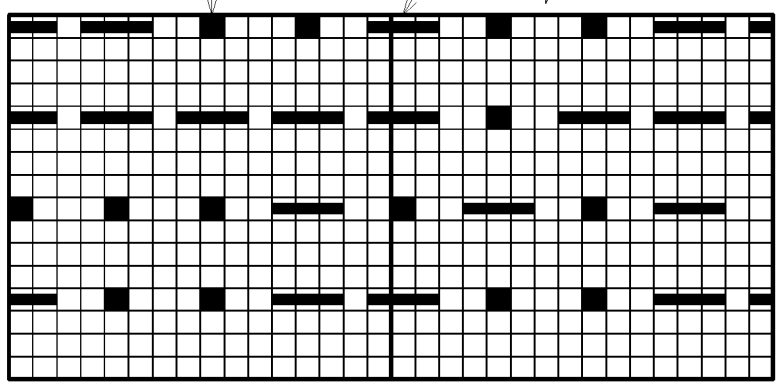

A closer look at FIG. 16 or 17 shows that the dots are non-equidistantly arranged. Thus, small irregularities appear in the background. Referring to FIG. 20, the following describes a method of removing such small irregularities. FIG. 20 is a diagram showing the method for eliminating the small irregularities in the background. FIG. 20a shows normal dots used as positioning dots and information dots, FIG. 20b represents dummy dots, and FIG. 20c indicates an example of the information segment IS where dummy dots are arranged.

As shown in FIG. 20a, the normal dots DT used as the positioning dots and the information dots have a size of 9 pixels (=3-by-3 pixels), similarly to the case of FIG. 8. In the meantime, as shown in FIG. 20b, the dummy dots DD have a size of 9 pixels (=one vertical pixel by 9 horizontal pixels). Thus, the normal dots DT and dummy dots DD have the same density when viewed as a background.

In terms of shape, however, a normal dot DT is square or is formed in a shape where the vertical and horizontal dimensions are almost the same. The dummy dot DD is rectangle or oblong. There is a great difference between them. When information is read out from the background, the normal dots DT and dummy dots DD can be distinguished by their shape, so that it is possible to read only the normal dots DT.

As shown in FIG. 20c, dummy dots DD are provided in all the information dot positions, where the information dots are not provided, out of all information dots shown in gray in FIGS. 8 and 14a. This arrangement makes the normal dots DT or dummy dots DD be provided at equally spaced intervals over the entire background, wherein the background is provided with more uniform density and greater visual advantages. Further, the dummy dots DD are arranged across the boundary of the information pattern IP. This allows the boundary of the information pattern IP to be less conspicuous. In this case as well, there is no problem in reading the information from the background, as described above.

The normal dots shown in FIGS. 5(D) and 5(E) of the aforementioned "Patent Literature 1" or FIG. 14 can be used as the normal dots DT and dummy dots DD used here. In this case, it is preferred that the pattern images 0 of FIGS. 5(D) and (E) or FIG. 14 are used as normal dots DT, and the pattern images 1 are used as dummy dots DD, or the pattern images 0 are used as dummy dots DD, and the pattern images 1 are used as normal dots DT.

As described above, in the first embodiment, dummy dots DD are arranged in all the information dot positions where information dots are not provided. This provides a background with more uniform density, and greater visual advantages. Further, this arrangement allows the boundary of the information pattern IP to be less conspicuous.

(Embodiment 2)

Figure 21:
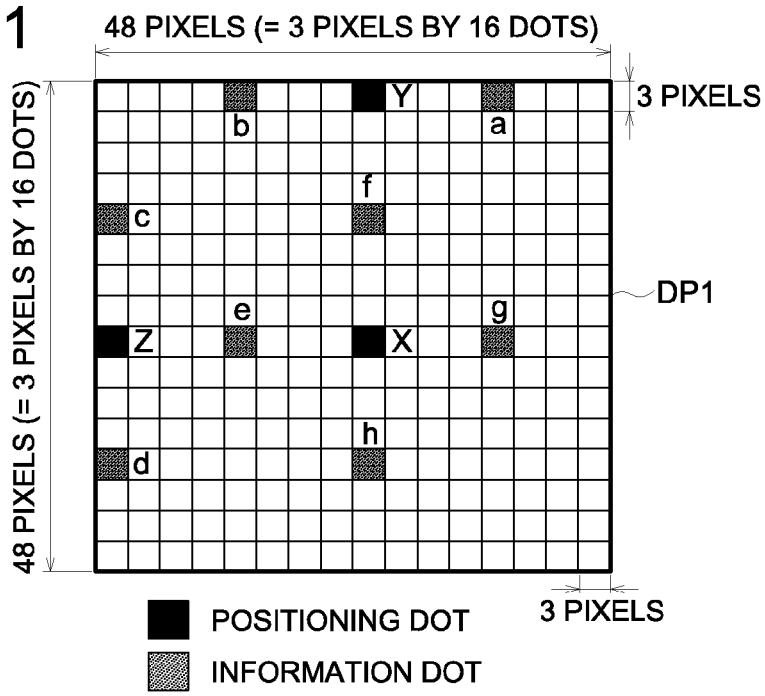
FIG. 21 is a schematic diagram showing a second example of the dot pattern chart for expressing the first information.

The second embodiment will be described with reference to FIGS. 21 through 23. In the first place, the following describes the method of generating the embed-image BD when the information pattern representing the first information INF1 and the information pattern representing the second information INF2 have different positioning dots. FIG. 21 is a schematic diagram showing a second example of the dot pattern chart DP1 for expressing the first information INF1.

In FIG. 21, similarly to the case of FIG. 8, one square cell of the dot pattern chart DP1 indicates the position corresponding to one dot. One dot has a size of 3-by-3 pixels for printing. To be more specific, one dot is formed by the printing of 3-by-3 pixels. The bit pattern corresponding to one embed-data unit EU is composed of 16 square cells in both the horizontal and vertical directions; namely, it is composed of 48 pixels. The black square cell indicates the position wherein the dot is provided (hereinafter referred to as "dot-on position"). The white square cell indicates the position wherein the dot is not provided (hereinafter referred to as "dot-off position"). The gray square cell indicates the position wherein the dot is provided or is not provided (namely, the dot is on or off).

The three on-dots X, Y and Z shown in FIG. 8, as shown in FIG. 21, are positioning dots. These dots are provided in every dot pattern, and provide a reference for dot pattern positioning. The gray dot is either provided with a dot or not provided depending on the value of the embed-data unit EU. Namely, the gray dot is an information dot. The value of the data is represented by providing a dot or not.

In FIG. 21, similarly to the case of FIG. 8, there are eight information dots at the positions "a" to "h". The positions of "a" to "d" are the same as those of A through D in FIG. 14 instead of those in FIG. 8. However, the positions of "e" through "h" are the same as those in FIG. 8. Similarly to the case of the first embodiment, the first information INF1 is subjected to information patterning by the dot pattern chart DP1 of FIG. 21, whereby a first embed-image ED1 of a 5-by-5 pattern is generated.

Figure 22A:
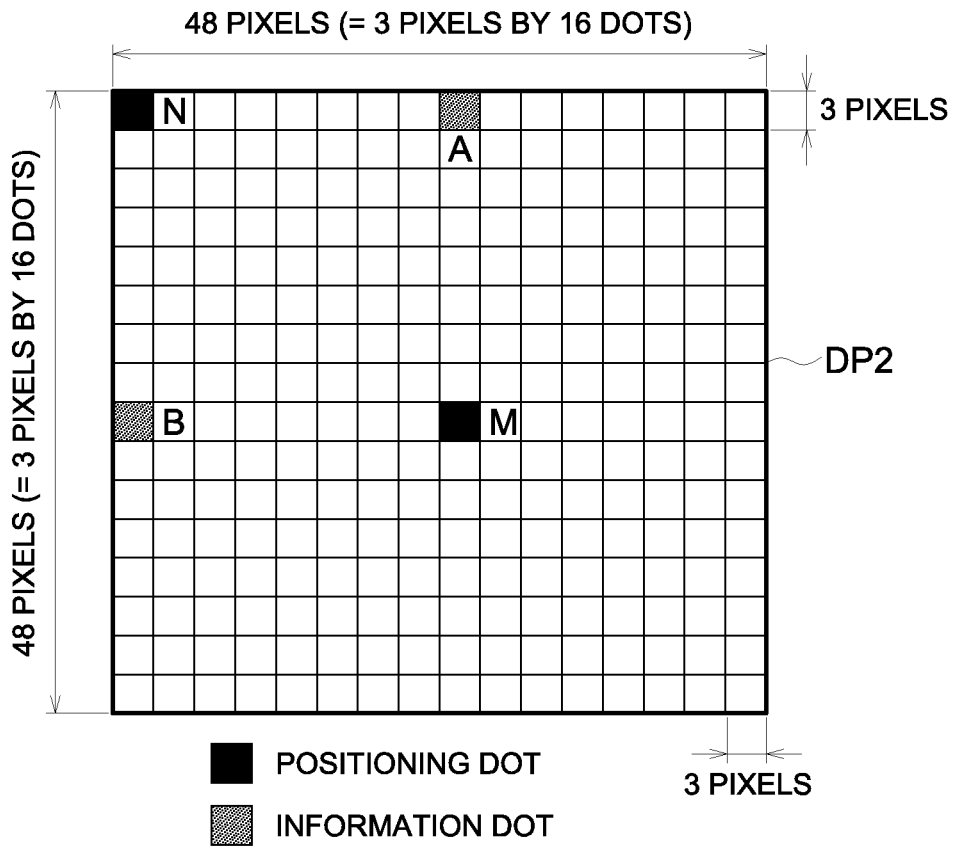
FIGS. 22a and 22b are diagrams showing the information pattern for expressing the reproduction prohibition information as an example of the second information.
Figure 22B:
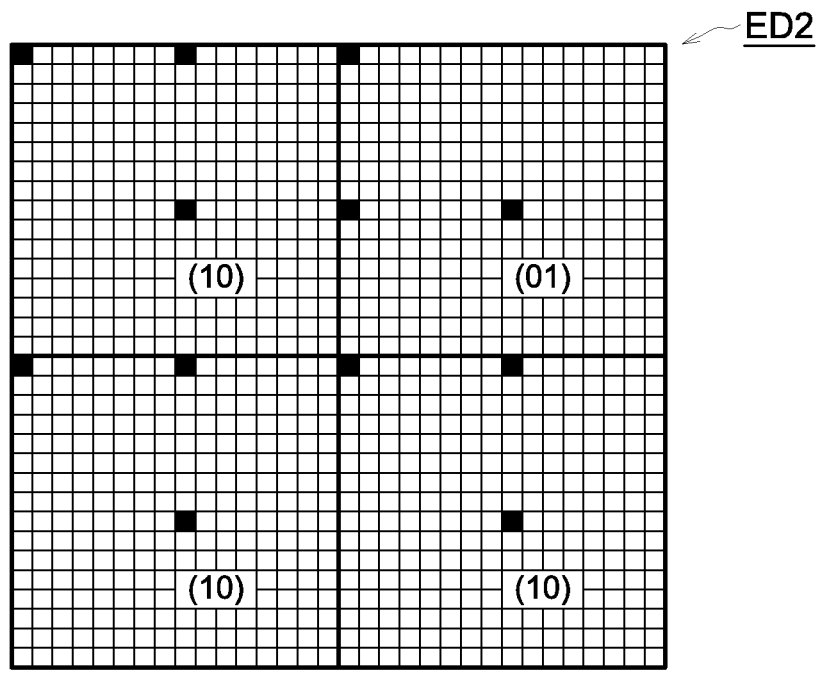

FIG. 22 is a diagram showing the information pattern for expressing the reproduction prohibition information as an example of the second information INF2. FIG. 22a indicates a second example of the second dot pattern chart DP2, and FIG. 22b denotes a second embed-image ED2 of 2-by-2 pattern representing the reproduction prohibition information.

In FIG. 22a, similarly to the case of FIG. 21, one square cell of the second dot pattern chart DP2 indicates the position corresponding to one dot. One dot has a size of 3-by-3 pixels for printing. To be more specific, one dot is formed by the printing of 3-by-3 pixels. The bit pattern corresponding to one embed-data unit EU is composed of 16 square cells in both the horizontal and vertical directions, namely, it is composed of 48 pixels. The black square cell indicates the position where a dot is provided (hereinafter referred to as "dot-on position"). The white square cell indicates the position where a dot is not provided (hereinafter referred to as "dot-off position"). The gray square cell indicates the position where a dot is provided or not provided (namely, the dot is on or off).

The two on-dots on the upper left N and center M shown in FIG. 22a are positioning dots. These dots are provided in every dot pattern, and provide a reference for dot pattern positioning. The position and number of the positioning dots are different from those of FIG. 14a. The gray dot is provided with a dot or not provided depending on the value of the embed-data unit EU. Namely, the gray dot is an information dot. The value of the data is represented by providing or not providing with a dot.

The information dots of FIG. 22a are located at two positions—upper center A and center B in the drawing. They are located at the same positions as the positioning dots in two positions other than the center of FIG. 14a.

FIG. 22b denotes a second embed-image ED2 of a 2-by-2 pattern generated by the second dot pattern chart DP2 of FIG. 22a and represents the reproduction prohibition information. Here the reproduction prohibition information is represented by "10", "01", "10" and "10".

Figure 23A:
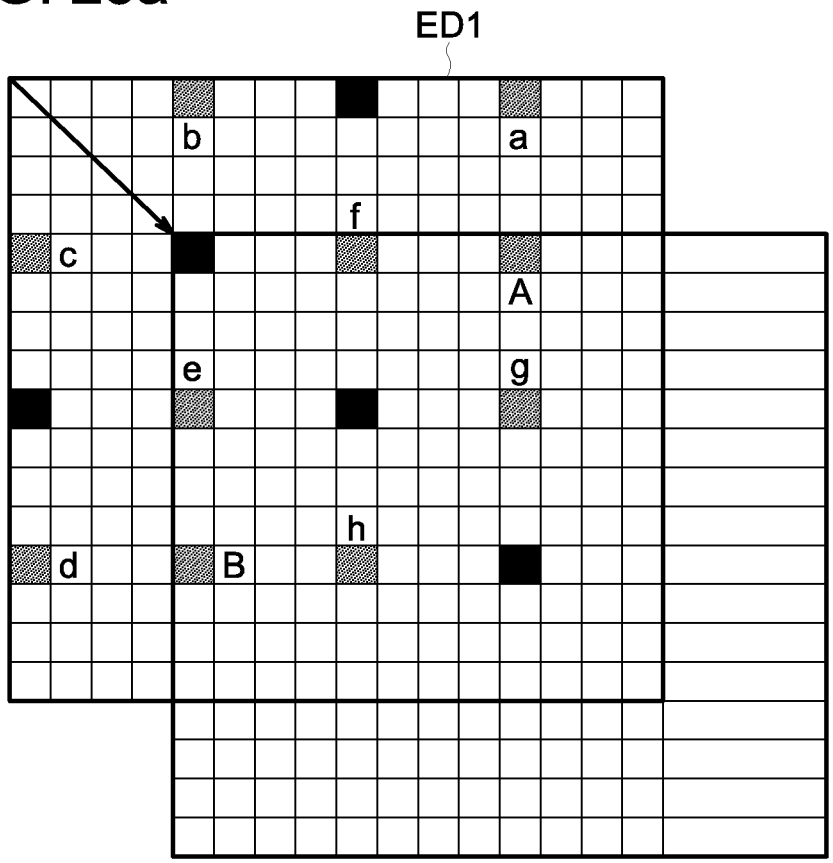
FIGS. 23a and 23b are diagrams showing an example of the method for generating an embed-image.
Figure 23B:
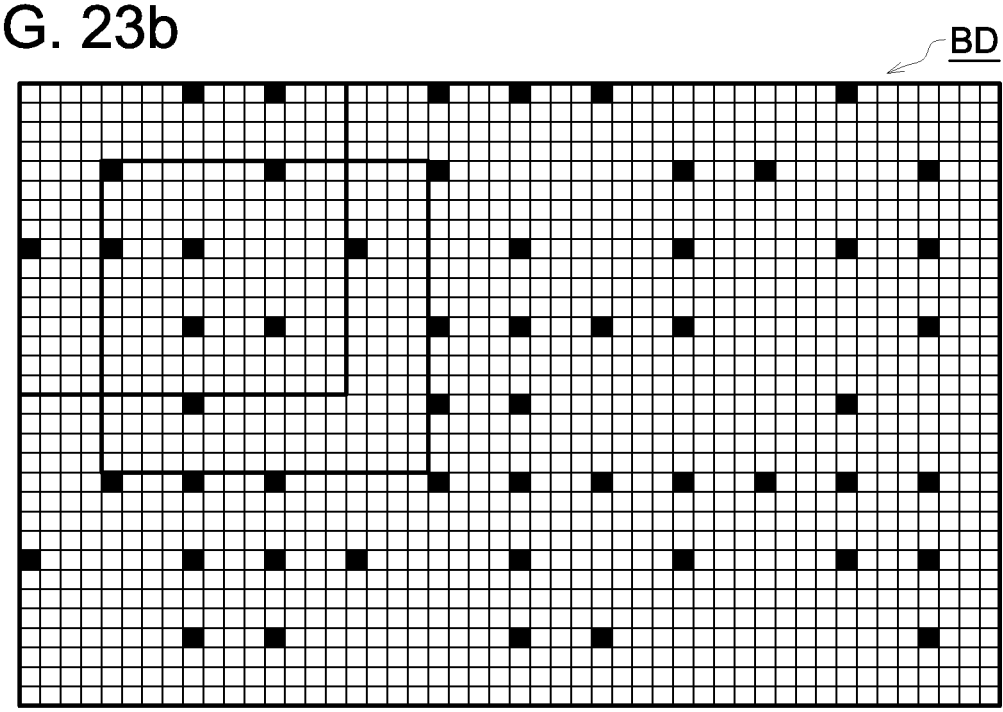

The following describes the method of generating an embed-image BD, with reference to FIG. 23. FIG. 23 is a diagram showing an example of the method of generating the embed-image BD. FIG. 23a indicates the method of superimposing the embed-image BD, and FIG. 23b shows an example of the embed-image BD having been generated.

In FIG. 23a, the first pattern of the second embed-image ED2 of a 2-by-2 pattern representing the reproduction prohibition information of FIG. 22b is displaced 4 dots to the right (12 pixels) in the drawing, and four dots to the bottom (12 pixels) with respect to the first pattern of the first embed-image ED1 of a 5-by-5 pattern generated by the dot pattern chart DP1 of FIG. 21, and is superimposed thereon, whereby the embed-image BD is generated.

FIG. 23b illustrates the 3-by-2 pattern area of the first embed-image ED1 of the embed-image BD generated by superimposition in the aforementioned manner. Two square cells shown in heavy lines on the upper left of FIG. 23b indicate the area of the first embed-image ED1 and second embed-image ED2 in FIG. 23a.

As will be apparent from FIG. 23b, according to the second embodiment, superimposition is carried out by displacing the patterns so as to cause a partial overlapping of the areas representing the two types of information. This arrangement ensures that the two types of information are embedded so that the boundary between the two types of information is made less conspicuous than the first embodiment, and there is no possibility of causing problems related to visibility such as periodicity.

The dummy information or dummy dot in variations 1 and 2 of the first embodiment described above can be applied to the present second embodiment.

As described above, the present invention provides an information embedding method, its program and an information embedding device wherein the aforementioned information embedding method includes a first information embedding method that is used to embed first information and is specified by a first information expression rule, and a second information embedding method that is used to embed second information and is specified by a second information expression rule different from the first information expression rule. The aforementioned first embedding method and second embedding method are used to embed the first and second information in such a way that there is at least a partial overlap between the first and second information in one and the same area, thereby generating an embed-image that is visually pleasing because the boundary between the first information and second information is not conspicuous, and is also safer because decoding of the embedded information is not easy.

It is to be expressly understood that the detailed structures and detailed operations of the components constituting the information embedding method, its program and an information embedding device of the present invention can be modified as appropriate, without departing from the technological spirit and scope of the present invention.

The invention claimed is:

1. A method for embedding information in a printed image, the information being represented by positions of dots which are to be superimposed on a document image and be printed on a sheet together with the document image, the method comprising:
embedding, in the document image according to a first information expression rule, a first embed-image including first dots; and
embedding, in the document image according to a second information expression rule different from the first information expression rule, a second embed-image including second dots;
printing the document image, including the embedded first embed-image and the embedded second embed-image, on the sheet;
wherein, after the printing, positions of the first dots on the sheet represent first information, positions of the second dots on the sheet represent second information, and at least a part of the first embed-image and a part of the second embed-image exist in the same region on the sheet.

2. The information embedding method of claim 1, wherein the first information and the second information are embedded each having a basic unit of different size of region from each other.

3. The information embedding method of claim 1, wherein the first information expression rule and the second information expression rule each expresses different information volume from each other.

4. The information embedding method of claim 1, wherein the second information includes information for indicating prohibition or permission of a predetermined operation.

5. The information embedding method of claim 4, wherein the first information includes information having an influence on the second information.

6. An information embedding method for embedding information represented by positions in which dots are to be embedded, the information embedding method comprising the steps of:
embedding first information according to a first information expression rule; and
embedding second information according to a second information expression rule different from the first information expression rule such that at least a part of the first information and a part of the second information exist in the same region
wherein the second information includes information for indicating prohibition or permission of a predetermined operation, and the first information includes information having an influence on the second information, and wherein the first information further includes information for canceling the prohibition of the predetermined operation.

7. A non-transitory computer readable storing medium storing a program for making a computer execute an information embedding method for embedding information represented by positions of dots which are to be superimposed on a document image and be printed on a sheet together with the document image, the information embedding method comprising the steps of:

embedding, in the document image according to a first information expression rule, a first embed-image including first dots so that positions of the first dots on the sheet represent first information when the first embed-image and the document image are printed on the sheet; and embedding, in the document image according to a second information expression rule different from the first information expression rule, a second embed-image including second dots so that positions of the second dots on the sheet represent second information when the second embed-image and the document image are printed on the sheet, such that at least a part of the first embed-image and a part of the second embed-image exist in the same region.

8. The non-transitory computer readable storage medium of claim 7, wherein the first information and the second information are embedded each having a basic unit of different size of region from each other.

9. The non-transitory computer readable storage medium of claim 7, wherein the first information expression rule and the second information expression rule each expresses different information volume from each other.

10. The non-transitory computer readable storage medium of claim 7, wherein the second information includes information for indicating prohibition or permission of a predetermined operation.

11. The non-transitory computer readable storage medium of claim 10, wherein the first information includes information having an influence on the second information.

12. A non-transitory computer readable storage medium storing a program for making a computer execute an information embedding method for embedding information represented by positions in which dots are to be embedded, the information embedding method comprising the steps of:

embedding first information according to a first information expression rule; and embedding second information according to a second information expression rule different from the first information expression rule such that at least a part of the first information and a part of the second information exist in the same region wherein the second information includes information for indicating prohibition or permission of a predetermined operation, and the first information includes information having an influence on the second information, and wherein the first information further includes information for canceling the prohibition of the predetermined operation.

13. An information embedding apparatus, comprising:

a controller configured to embed information by using an information embedding method for embedding information represented by positions of dots which are to be superimposed on a document image and be printed on a sheet together with the document image, the information embedding method including the steps of:

embedding, in the document image according to a first information expression rule, a first embed-image including first dots so that positions of the first dots on the sheet represent first information when the first embed-image and the document image are printed on the sheet; and embedding, in the document image according to a second information expression rule different from the first information expression rule, a second embed-image including second dots so that positions of the second dots on the sheet represent second information when the second embed-image and the document image are printed on the sheet, such that at least a part of the first embed-image and a part of the second embed-image exist in the same region.

14. An information embedding method comprising:

causing an information embedding apparatus to embed information, the information embedding apparatus including a controller configured to embed information by using an information processing method for embedding information represented by positions of dots which are to be superimposed on a document image and be printed on a sheet together with the document image, the information processing method including the steps of embedding, in the document image according to a first information expression rule, a first embed-image including first dots so that positions of the first dots on the sheet represent first information when the first embed-image and the document image are printed on the sheet; and embedding, in the document image according to a second information expression rule different from the first information expression rule, a second embed-image including second dots so that positions of the second dots on the sheet represent second information when the second embed-image and the document image are printed on the sheet, such that at least a part of the first embed-image and a part of the second embed-image exist in the same region.

* * * * *